(12) United States Patent
Sakhnini et al.

(10) Patent No.: US 11,937,197 B2
(45) Date of Patent: Mar. 19, 2024

(54) TECHNIQUES FOR USING A SYNCHRONIZATION SIGNAL BLOCK FOR MEASUREMENTS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Wanshi Chen, San Diego, CA (US); Wooseok Nam, San Diego, CA (US); Junyi Li, Franklin Park, NJ (US); Juan Montojo, San Diego, CA (US); Hwan Joon Kwon, San Diego, CA (US); Jelena Damnjanovic, Del Mar, CA (US); Olufunmilola Omolade Awoniyi-Oteri, San Diego, CA (US); Mahmoud Taherzadeh Boroujeni, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 311 days.

(21) Appl. No.: 17/231,266

(22) Filed: Apr. 15, 2021

(65) Prior Publication Data

US 2021/0329579 A1    Oct. 21, 2021

Related U.S. Application Data

(60) Provisional application No. 63/011,885, filed on Apr. 17, 2020.

(51) Int. Cl.
*H04W 56/00* (2009.01)
*H04W 24/08* (2009.01)
*H04W 24/10* (2009.01)

(52) U.S. Cl.
CPC ....... *H04W 56/0015* (2013.01); *H04W 24/08* (2013.01); *H04W 24/10* (2013.01)

(58) Field of Classification Search
CPC . H04W 56/0015; H04W 24/08; H04W 24/10; H04W 48/12; H04L 5/001; H04L 5/0048; H04L 27/2602; H04L 27/2613; H04L 27/26025
See application file for complete search history.

(56) References Cited

U.S. PATENT DOCUMENTS

2017/0156121 A1* 6/2017 Tian ................ H04W 72/23
2021/0176687 A1* 6/2021 Ko .................... H04L 5/0053

* cited by examiner

*Primary Examiner* — Ayanah S George
(74) *Attorney, Agent, or Firm* — Holland & Hart LLP

(57) ABSTRACT

Methods, systems, and devices for wireless communications are described to support using one of multiple types of synchronization signal blocks (SSBs) to perform one or more management procedures. A base station may configure and transmit one or more SSBs of second type that are smaller than SSBs of a first type. For instance, SSBs of a second type may include a first subset of signals and may exclude a second subset of the signals that are included in an SSB of the first type. An SSB of the second type may be transmitted in an active bandwidth region used for communications between a user equipment (UE) and the base station. The UE may receive an SSB of the second type in an active bandwidth region, may perform one or more measurements using the SSB of the second type, and may perform one or more management procedures.

31 Claims, 18 Drawing Sheets

… (1)

TECHNIQUES FOR USING A SYNCHRONIZATION SIGNAL BLOCK FOR MEASUREMENTS

CROSS REFERENCE

The present application for patent claims the benefit of U.S. Provisional Patent Application No. 63/011,885 by SAKHNINI et al., entitled "TECHNIQUES FOR USING A SYNCHRONIZATION SIGNAL BLOCK FOR MEASUREMENTS," filed Apr. 17, 2020, assigned to the assignee hereof, and expressly incorporated by reference herein.

TECHNICAL FIELD

The following relates generally to wireless communications and more specifically to techniques for using a synchronization signal block for measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A UE may use a synchronization signal block to acquire downlink synchronization information and system information, and to perform one or more management procedures for a communication link with a base station.

SUMMARY

The described techniques relate to improved methods, systems, devices, and apparatuses that support techniques for using a synchronization signal block (SSB) for measurements. Generally, the described techniques provide techniques for using one or more lean SSBs to perform one or more management procedures. A wireless communications system may support a first type of SSB and a second type of SSB. The first type of SSB may include one or more primary synchronization signals (PSS), one or more secondary synchronization signals (SSS), and signals associated with a physical broadcast channel (PBCH). The second type of SSB (e.g., lean SSB) may include a subset of signals included in the first type of SSB. For example, the second type of SSB may include one or more PSSs or one or more SSSs or a combination thereof. A base station may configure and transmit one or more lean SSBs. A lean SSB may be transmitted in a bandwidth region (e.g., a bandwidth part (BWP) or a narrow BWP) used for communications between a user equipment (UE) (e.g., a reduced-capability UE) and the base station. The UE may be configured to use a lean SSB for one or more management procedures, which may result in higher quality measurements, reduced resource use, reduced power consumption, or a combination thereof.

In some cases, the narrow BWP used for communications between the UE and the base station may change frequency spectrum band (e.g., may "hop" in the frequency domain). In such cases, the base station may configure one or more anchor BWPs, such that the one or more anchor BWPs may each include transmissions of one or more lean SSBs. When the narrow BWP changes frequency ranges, the narrow BWP may, at some times, at least partially coincide with an anchor BWP to support reception of a lean SSB at the UE, such that the UE may receive (e.g., decode) and measure the lean SSB and perform one or more management procedures based on the lean SSB. The UE or the base station or both may be configured with one or more parameters associated with lean SSBs to support transmission and/or reception of a lean SSB and in order to support performance of the one or more management procedures based on a lean SSB. The UE may receive (e.g., decode) a lean SSB in an active narrow BWP (e.g., based on one or more parameters), may perform one or more measurements of the lean SSB, and may perform one or more management procedures based on the one or more measurements.

A method of wireless communication at a UE is described. The method may include receiving, from a base station and in a first bandwidth region, a first type of SSB including one or more broadcast signals, one or more first synchronization signals, and one or more second synchronization signals, receiving, in a second bandwidth region, a second type of SSB that includes a first subset of signals of the first type of SSB and excludes a second subset of signals of the first type of SSB, and performing a management procedure for a communication link between the UE and the base station based on receiving the second type of SSB.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive, from a base station and in a first bandwidth region, a first type of SSB including one or more broadcast signals, one or more first synchronization signals, and one or more second synchronization signals, receive, in a second bandwidth region, a second type of SSB that includes a first subset of signals of the first type of SSB and excludes a second subset of signals of the first type of SSB, and perform a management procedure for a communication link between the UE and the base station based on receiving the second type of SSB.

Another apparatus for wireless communication at a UE is described. The apparatus may include means for receiving, from a base station and in a first bandwidth region, a first type of SSB including one or more broadcast signals, one or more first synchronization signals, and one or more second synchronization signals, receiving, in a second bandwidth region, a second type of SSB that includes a first subset of signals of the first type of SSB and excludes a second subset of signals of the first type of SSB, and performing a management procedure for a communication link between the UE and the base station based on receiving the second type of SSB.

A non-transitory computer-readable medium storing code for wireless communication at a UE is described. The code may include instructions executable by a processor to receive, from a base station and in a first bandwidth region, a first type of SSB including one or more broadcast signals, one or more first synchronization signals, and one or more second synchronization signals, receive, in a second bandwidth region, a second type of SSB that includes a first subset of signals of the first type of SSB and excludes a second subset of signals of the first type of SSB, and perform a management procedure for a communication link between the UE and the base station based on receiving the second type of SSB.

In some examples of the method, apparatuses, and non-transitory computer-readable medium described herein, the second subset of signals excluded from the second type of SSB includes the one or more broadcast signals, and where the one or more broadcast signals include one or more reference signals and one or more information blocks transmitted via a broadcast channel.

In some examples of the method, apparatuses, and non-transitory computer-readable medium described herein, the first subset of signals of the second type of SSB includes a first synchronization signal of the one or more first synchronization signals or a second synchronization signal of the one or more second synchronization signals.

Some examples of the method, apparatuses, and non-transitory computer-readable medium described herein may further include operations, features, means, or instructions for determining that a bandwidth region used for communications with the base station excludes at least a portion of a bandwidth associated with the first type of SSB, where receiving the second type of SSB may be based on determining that the bandwidth region used for communications with the base station excludes the at least the portion of the bandwidth associated with the first type of SSB.

Some examples of the method, apparatuses, and non-transitory computer-readable medium described herein may further include operations, features, means, or instructions for receiving, from the base station, an indication that the second type of SSB may be transmitted in the second bandwidth region, where receiving the second type of SSB may be based on receiving the indication that the second type of SSB may be transmitted in the second bandwidth region.

Some examples of the method, apparatuses, and non-transitory computer-readable medium described herein may further include operations, features, means, or instructions for receiving, from the base station, an indication that the second bandwidth region may be associated with one or more management procedures for the communication link between the UE and the base station that include the management procedure, where performing the management procedure may be based on receiving the indication that the second bandwidth region may be associated with the one or more management procedures.

Some examples of the method, apparatuses, and non-transitory computer-readable medium described herein may further include operations, features, means, or instructions for receiving, from the base station, an indication that the second type of SSB may be transmitted in one or more bandwidth regions that include the second bandwidth region.

Some examples of the method, apparatuses, and non-transitory computer-readable medium described herein may further include operations, features, means, or instructions for performing the management procedure may be independent of whether the second type of SSB may be received in the second bandwidth region, may be received in a different bandwidth region of one or more additional bandwidth regions, or any combination thereof.

Some examples of the method, apparatuses, and non-transitory computer-readable medium described herein may further include operations, features, means, or instructions for receiving, from the base station, an indication that one or more additional bandwidth regions may be associated with one or more management procedures for the communication link between the UE and the base station that include the management procedure.

Some examples of the method, apparatuses, and non-transitory computer-readable medium described herein may further include operations, features, means, or instructions for receiving, from the base station, an indication of one or more parameters associated with the second type of SSB and with one or more management procedures for the communication link between the UE and the base station that include the management procedure, where performing the management procedure may be based on receiving the indication of the one or more parameters.

In some examples of the method, apparatuses, and non-transitory computer-readable medium described herein, the one or more parameters include one or more indices of the second type of SSB, one or more thresholds associated with the one or more management procedures, or any combination thereof.

Some examples of the method, apparatuses, and non-transitory computer-readable medium described herein may further include operations, features, means, or instructions for identifying a default configuration for performing the management procedure based on using the second type of SSB, where performing the management procedure may be based on identifying the default configuration for performing the management procedure based on the second type of SSB.

Some examples of the method, apparatuses, and non-transitory computer-readable medium described herein may further include operations, features, means, or instructions for identifying that one or more random access occasions associated with the management procedure may be configured to be quasi co-located (QCLed) with the second type of SSB, and identifying that one or more search spaces associated with the management procedure may be configured to be QCLed with the second type of SSB.

Some examples of the method, apparatuses, and non-transitory computer-readable medium described herein may further include operations, features, means, or instructions for monitoring at least a portion of the second bandwidth region according to a periodicity, where receiving the second type of SSB may be based on monitoring the second bandwidth region according to the periodicity.

Some examples of the method, apparatuses, and non-transitory computer-readable medium described herein may further include operations, features, means, or instructions for receiving, from the base station, a pattern for monitoring one or more bandwidth regions, where monitoring the second bandwidth region according to the periodicity may be based on the pattern for monitoring the one or more bandwidth regions.

In some examples of the method, apparatuses, and non-transitory computer-readable medium described herein, monitoring the at least the portion of the second bandwidth region according to the periodicity may include operations, features, means, or instructions for receiving, from the base station, one or more parameters associated with the periodicity and one or more parameters for identifying the second bandwidth region, identifying a value of a timer associated with the periodicity based on receiving the one or more parameters associated with the periodicity, and monitoring the at least the portion of the second bandwidth region based on the value of the timer and the one or more parameters for identifying the second bandwidth region.

Some examples of the method, apparatuses, and non-transitory computer-readable medium described herein may further include operations, features, means, or instructions for identifying, based on the one or more parameters for identifying the second bandwidth region, that the second bandwidth region may be closer to an active bandwidth region currently used by the UE than one or more other bandwidth regions associated with transmitting the second type of SSB, where monitoring the at least the portion of the second bandwidth region may be based on identifying that the second bandwidth region may be closer to the active bandwidth region currently used by the UE than the one or more other bandwidth regions.

Some examples of the method, apparatuses, and non-transitory computer-readable medium described herein may further include operations, features, means, or instructions for identifying, based on the one or more parameters for identifying the second bandwidth region, a pattern for monitoring one or more bandwidth regions used for transmitting the second type of SSB, where monitoring the at least the portion of the second bandwidth region may be based on identifying the pattern for monitoring one or more other bandwidth regions.

Some examples of the method, apparatuses, and non-transitory computer-readable medium described herein may further include operations, features, means, or instructions for identifying, based on the one or more parameters for identifying the second bandwidth region, a group of one or more bandwidth regions including an active bandwidth region of the UE and the second bandwidth region, where monitoring the at least the portion of the second bandwidth region may be based on identifying the group of one or more bandwidth regions.

Some examples of the method, apparatuses, and non-transitory computer-readable medium described herein may further include operations, features, means, or instructions for receiving, from the base station, an indication of a pattern of a bandwidth region used to transmit the second type of SSB, the pattern of the bandwidth region corresponding to one or more parameters independent of a frequency monitoring pattern at the UE, where receiving the second type of SSB may be based on the indication of the pattern of the bandwidth region used to transmit the second type of SSB.

Some examples of the method, apparatuses, and non-transitory computer-readable medium described herein may further include operations, features, means, or instructions for receiving, from the base station, an indication of a change in a configuration for one or more bandwidth regions used to transmit the second type of SSB, where receiving the second type of SSB may be based on the change in the configuration for the one or more bandwidth regions used to transmit the second type of SSB.

Some examples of the method, apparatuses, and non-transitory computer-readable medium described herein may further include operations, features, means, or instructions for receiving, from the base station, an indication of a change in a configuration for the second type of SSB in the second bandwidth region, where receiving the second type of SSB may be based on the change in the configuration for the second type of SSB in the second bandwidth region.

Some examples of the method, apparatuses, and non-transitory computer-readable medium described herein may further include operations, features, means, or instructions for receiving, from the base station, an indication of one or more parameters defining an offset between a frequency location of an active bandwidth region of the UE and a frequency location of the second type of SSB, a frequency location of the second bandwidth region, or any combination thereof, where receiving the second type of SSB may be based on the one or more parameters defining the offset.

In some examples of the method, apparatuses, and non-transitory computer-readable medium described herein, the management procedure includes a radio link monitoring procedure, a radio resource measurement procedure, a beam management procedure, a beam failure detection procedure, a beam failure recovery procedure, or any combination thereof.

In some examples of the method, apparatuses, and non-transitory computer-readable medium described herein, the first bandwidth region and the second bandwidth region include bandwidth parts, narrow bandwidth parts, or any combination thereof.

A method of wireless communication at a base station is described. The method may include transmitting, in a first bandwidth region, a first type of SSB including one or more broadcast signals, one or more first synchronization signals, and one or more second synchronization signals and transmitting, in a second bandwidth region, a second type of SSB that includes a first subset of signals of the first type of SSB and excludes a second subset of signals of the first type of SSB, where a management procedure for a communication link between a UE and the base station is based on the second type of SSB.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, in a first bandwidth region, a first type of SSB including one or more broadcast signals, one or more first synchronization signals, and one or more second synchronization signals and transmit, in a second bandwidth region, a second type of SSB that includes a first subset of signals of the first type of SSB and excludes a second subset of signals of the first type of SSB, where a management procedure for a communication link between a UE and the base station is based on the second type of SSB.

Another apparatus for wireless communication at a base station is described. The apparatus may include means for transmitting, in a first bandwidth region, a first type of SSB including one or more broadcast signals, one or more first synchronization signals, and one or more second synchronization signals and transmitting, in a second bandwidth region, a second type of SSB that includes a first subset of signals of the first type of SSB and excludes a second subset of signals of the first type of SSB, where a management procedure for a communication link between a UE and the base station is based on the second type of SSB.

A non-transitory computer-readable medium storing code for wireless communication at a base station is described. The code may include instructions executable by a processor to transmit, in a first bandwidth region, a first type of SSB including one or more broadcast signals, one or more first synchronization signals, and one or more second synchronization signals and transmit, in a second bandwidth region, a second type of SSB that includes a first subset of signals of the first type of SSB and excludes a second subset of signals of the first type of SSB, where a management procedure for a communication link between a UE and the base station is based on the second type of SSB.

In some examples of the method, apparatuses, and non-transitory computer-readable medium described herein, the second subset of signals excluded from the second type of SSB includes the one or more broadcast signals, and where the one or more broadcast signals include one or more reference signals and one or more information blocks transmitted via a broadcast channel.

In some examples of the method, apparatuses, and non-transitory computer-readable medium described herein, the first subset of signals of the second type of SSB includes a first synchronization signal of the one or more first synchronization signals or a second synchronization signal of the one or more second synchronization signals.

Some examples of the method, apparatuses, and non-transitory computer-readable medium described herein may further include operations, features, means, or instructions for identifying that a bandwidth region used for communications with the UE excludes at least a portion of a bandwidth associated with the first type of SSB, and determining that the UE may be to perform the management procedure based on the second type of SSB based on identifying that the bandwidth region used for communications with the UE excludes the at least a portion of the bandwidth associated with the first type of SSB.

Some examples of the method, apparatuses, and non-transitory computer-readable medium described herein may further include operations, features, means, or instructions for transmitting, to the UE, an indication that the second type of SSB may be transmitted in the second bandwidth region, where the management procedure may be based on the indication that the second type of SSB may be transmitted in the second bandwidth region.

Some examples of the method, apparatuses, and non-transitory computer-readable medium described herein may further include operations, features, means, or instructions for transmitting, to the UE, an indication that the second bandwidth region may be associated with one or more management procedures for the communication link between the UE and the base station that include the management procedure, where the management procedure may be based on the indication that the second bandwidth region may be associated with the one or more management procedures.

Some examples of the method, apparatuses, and non-transitory computer-readable medium described herein may further include operations, features, means, or instructions for transmitting, to the UE, an indication that the second type of SSB may be transmitted in one or more bandwidth regions that include the second bandwidth region.

Some examples of the method, apparatuses, and non-transitory computer-readable medium described herein may further include operations, features, means, or instructions for performing the management procedure may be independent of whether the second type of SSB may be received in the second bandwidth region, may be received in a different bandwidth region of the one or more bandwidth regions, or any combination thereof.

Some examples of the method, apparatuses, and non-transitory computer-readable medium described herein may further include operations, features, means, or instructions for transmitting, to the UE, an indication that one or more additional bandwidth regions may be associated with one or more management procedures for the communication link between the UE and the base station that include the management procedure.

Some examples of the method, apparatuses, and non-transitory computer-readable medium described herein may further include operations, features, means, or instructions for transmitting, to the UE, an indication of one or more parameters associated with the second type of SSB and with one or more management procedures for the communication link between the UE and the base station that include the management procedure, where the management procedure may be based on receiving the indication of the one or more parameters.

In some examples of the method, apparatuses, and non-transitory computer-readable medium described herein, the one or more parameters include one or more indices of the second type of SSB, one or more thresholds associated with the one or more management procedures, or any combination thereof.

Some examples of the method, apparatuses, and non-transitory computer-readable medium described herein may further include operations, features, means, or instructions for identifying a default configuration for performing the management procedure based on using the second type of SSB, where the management procedure may be based on the default configuration for performing the management procedure based on the second type of SSB.

Some examples of the method, apparatuses, and non-transitory computer-readable medium described herein may further include operations, features, means, or instructions for identifying that one or more random access occasions associated with the management procedure may be configured to be QCLed with the second type of SSB, and identifying that one or more search spaces associated with the management procedure may be configured to be QCLed with the second type of SSB.

Some examples of the method, apparatuses, and non-transitory computer-readable medium described herein may further include operations, features, means, or instructions for transmitting, to the UE, a pattern for monitoring at least a portion of the second bandwidth region according to a periodicity, where the management procedure may be based on monitoring the second bandwidth region according to the periodicity.

Some examples of the method, apparatuses, and non-transitory computer-readable medium described herein may further include operations, features, means, or instructions for transmitting, to the UE, one or more parameters associated with a periodicity for monitoring at least a portion of the second bandwidth region and one or more parameters for identifying the second bandwidth region, where the management procedure may be based on the one or more parameters associated with the periodicity and the one or more parameters for identifying the second bandwidth region.

In some examples of the method, apparatuses, and non-transitory computer-readable medium described herein, the one or more parameters for identifying the second bandwidth region include an indication to identify that the second bandwidth region may be closer to an active bandwidth region currently used by the UE than one or more other bandwidth regions associated with transmitting the second type of SSB.

In some examples of the method, apparatuses, and non-transitory computer-readable medium described herein, the one or more parameters for identifying the second bandwidth region include an indication to identify a pattern for monitoring one or more bandwidth regions used for transmitting the second type of SSB.

In some examples of the method, apparatuses, and non-transitory computer-readable medium described herein, the one or more parameters for identifying the second bandwidth region include an indication to identify a group of one or more bandwidth regions including an active bandwidth region of the UE and the second bandwidth region.

Some examples of the method, apparatuses, and non-transitory computer-readable medium described herein may further include operations, features, means, or instructions for transmitting, to the UE, an indication of a pattern of a bandwidth region used to transmit the second type of SSB, the pattern of the bandwidth region corresponding to one or more parameters independent of a frequency monitoring pattern at the UE, where the management procedure may be based on the indication of the pattern of the bandwidth region used to transmit the second type of SSB.

Some examples of the method, apparatuses, and non-transitory computer-readable medium described herein may further include operations, features, means, or instructions for transmitting, to the UE, an indication of a change in a configuration for the second bandwidth region, where the management procedure may be based on the change in the configuration for the second bandwidth region.

Some examples of the method, apparatuses, and non-transitory computer-readable medium described herein may further include operations, features, means, or instructions for transmitting, to the UE, an indication of a change in a configuration for the second type of SSB in the second bandwidth region, where the management procedure may be based on the change in the configuration for the second type of SSB in the second bandwidth region.

Some examples of the method, apparatuses, and non-transitory computer-readable medium described herein may further include operations, features, means, or instructions for transmitting, to the UE, an indication of one or more parameters defining an offset between a frequency location of an active bandwidth region of the UE and a frequency location of the second type of SSB, a frequency location of the second bandwidth region, or any combination thereof, where the management procedure may be based on the one or more parameters defining the offset.

In some examples of the method, apparatuses, and non-transitory computer-readable medium described herein, the management procedure includes a radio link monitoring procedure, a radio resource measurement procedure, a beam management procedure, a beam failure detection procedure, a beam failure recovery procedure, or any combination thereof.

In some examples of the method, apparatuses, and non-transitory computer-readable medium described herein, the first bandwidth region and the second bandwidth region include bandwidth parts, narrow bandwidth parts, or any combination thereof.

DETAILED DESCRIPTION

Figure 1:
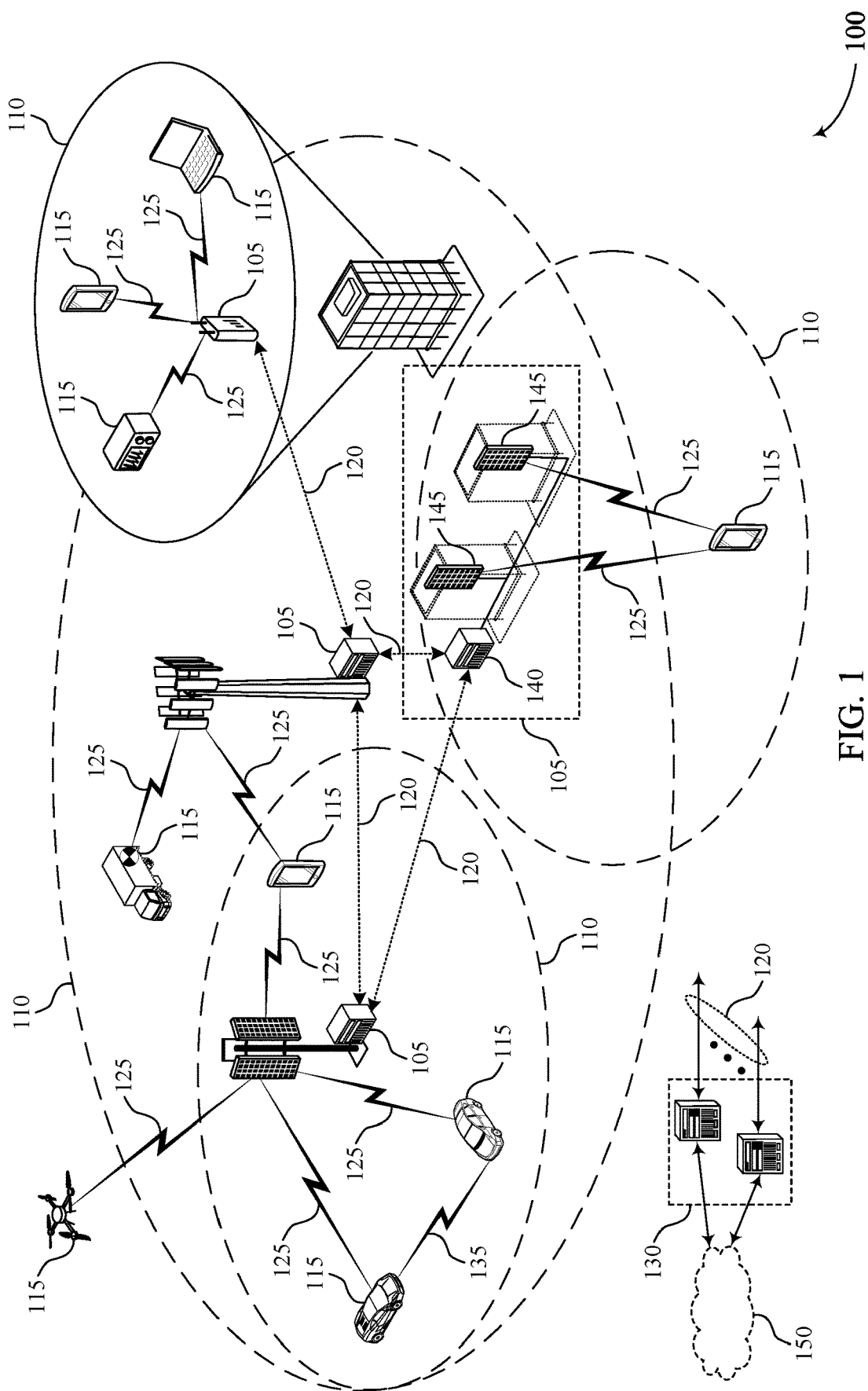
FIG. 1 illustrates an example of a wireless communications system that supports techniques for using a synchronization signal block (SSB) for measurements in accordance with aspects of the present disclosure.

A base station may transmit one or more synchronization signal blocks (SSBs) to a user equipment (UE) (e.g., may broadcast the one or more SSBs), and the UE may decode or receive the one or more SSBs in order to obtain system information and establish a communications link with the base station. As described herein, an SSB may represent a transmission that includes one or more synchronization signals, one or more broadcast signals, or any combination thereof. The UE may use an SSB to acquire downlink synchronization information and system information (e.g., to establish a communication link with the base station). In some cases, the UE may further use an SSB (e.g., one or more measurements of an SSB or a signal thereof) to perform one or more management procedures. A wireless communications system may support a first type of SSB and a second type of SSB. The first type of SSB may include one or more primary synchronization signals (PSS), one or more secondary synchronization signals (SSS), and signals associated with a physical broadcast channel (PBCH). The second type of SSB (e.g., lean SSB) may include a subset of signals included in the first type of SSB. For example, the second type of SSB may include one or more PSSs or one or more SSSs, or a combination thereof.

In some cases, the UE may represent an example of a reduced-capability UE that may operate with one or more of a reduced transmit power, a reduced number of transmit antennas, a reduced number of receive antennas, a reduced transmit/receive bandwidth, a reduced computational complexity, a reduced amount of available power, or any combination thereof. A reduced-capability UE, such as the UE, may communicate with a base station in a narrow bandwidth part (BWP) after performing acquisition procedures in an initial BWP. For example, the UE may receive an SSB from the base station in the initial BWP, may establish a communication link with the base station based on the SSB, and may switch to monitoring a narrow BWP (e.g., an active BWP). The narrow BWP, may represent, for example, a BWP that occupies a smaller range of frequencies (e.g., a narrow range of frequencies) than one or more other BWPs. In some cases, the narrow BWP may represent a BWP configured for use by a reduced-capability UE, such that the reduced-capability UE may monitor a smaller range of frequencies.

In some cases, a narrow BWP may not include a frequency range for receiving an SSB from the base station, and the UE may therefore be unable to perform one or more management procedures based on the SSB. The UE may, in some cases, switch to the initial BWP to receive the SSB and perform one or more of the management procedures, but switching to the initial BWP may consume power and introduce a signaling gap. The base station may, in some cases, configure an SSB for the narrow BWP used for communications between the UE and the base station, but doing so may increase overhead and resource use in the narrow BWP. In some cases, The UE may perform a management procedure based on one or more reference signals, but the reference signals may have a lower density in a narrow BWP and may result in lower quality measurements than an SSB.

The present disclosure provides techniques for the base station to configure and transmit one or more lean SSBs. A lean SSB may refer to a block of signals that include a first subset of signals (e.g., one or more synchronization signals such as PSSs or SSSs or both) of an SSB and may exclude a second subset of the signals (e.g., one or more broadcast signals such as signals related to the PBCH) of the SSB. A lean SSB may be transmitted in a bandwidth region (e.g., a BWP or a narrow BWP) and may reduce overhead and resource use when compared with an SSB, while providing higher-density transmissions when compared with reference signals. The UE may be configured to use a lean SSB for one or more management procedures, which may result in higher quality measurements, reduced resource use, reduced power consumption, or a combination thereof.

In some cases, the narrow BWP used for communications between the UE and the base station may change frequency ranges (e.g., may "hop" in frequency). In such cases, the base station may configure one or more anchor BWPs, such that the one or more anchor BWPs may each include transmissions of one or more lean SSBs. When the narrow BWP changes frequency ranges, the narrow BWP may, at some times, at least partially coincide with an anchor BWP to support reception of a lean SSB at the UE, such that the UE may receive (e.g., decode) and measure the lean SSB and perform one or more management procedures based on the lean SSB. The UE or the base station, or both, may be configured with one or more parameters associated with lean SSBs in order to support transmission or reception, or both, of a lean SSB and in order to support performance of the one or more management procedures based on a lean SSB. The UE may receive (e.g., decode) a lean SSB in an active narrow BWP (e.g., based on one or more parameters), may perform one or more measurements of the lean SSB, and may perform one or more management procedures based on the one or more measurements.

Aspects of the disclosure are initially described in the context of wireless communications systems. Aspects of the disclosure are further illustrated by and described with reference to signaling diagrams, a process flow, apparatus diagrams, system diagrams, and flowcharts that relate to techniques for using an SSB for measurements.

FIG. 1 illustrates an example of a wireless communications system 100 that supports techniques for using an SSB for measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be in the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located in one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105 may configure and transmit one or more lean SSBs, which may each include a first subset of signals (e.g., one or more synchronization signals) of an SSB and may exclude a second subset of the signals (e.g., one or more broadcast signals) of an SSB. A lean SSB may be transmitted in a narrow BWP and may reduce overhead and resource use when compared with an SSB, while providing higher-density transmissions when compared with reference signals. A UE 115 may be configured to use a lean SSB for one or more management procedures, which may result in higher quality measurements, reduced resource use, reduced power consumption, or a combination thereof.

Figure 2:
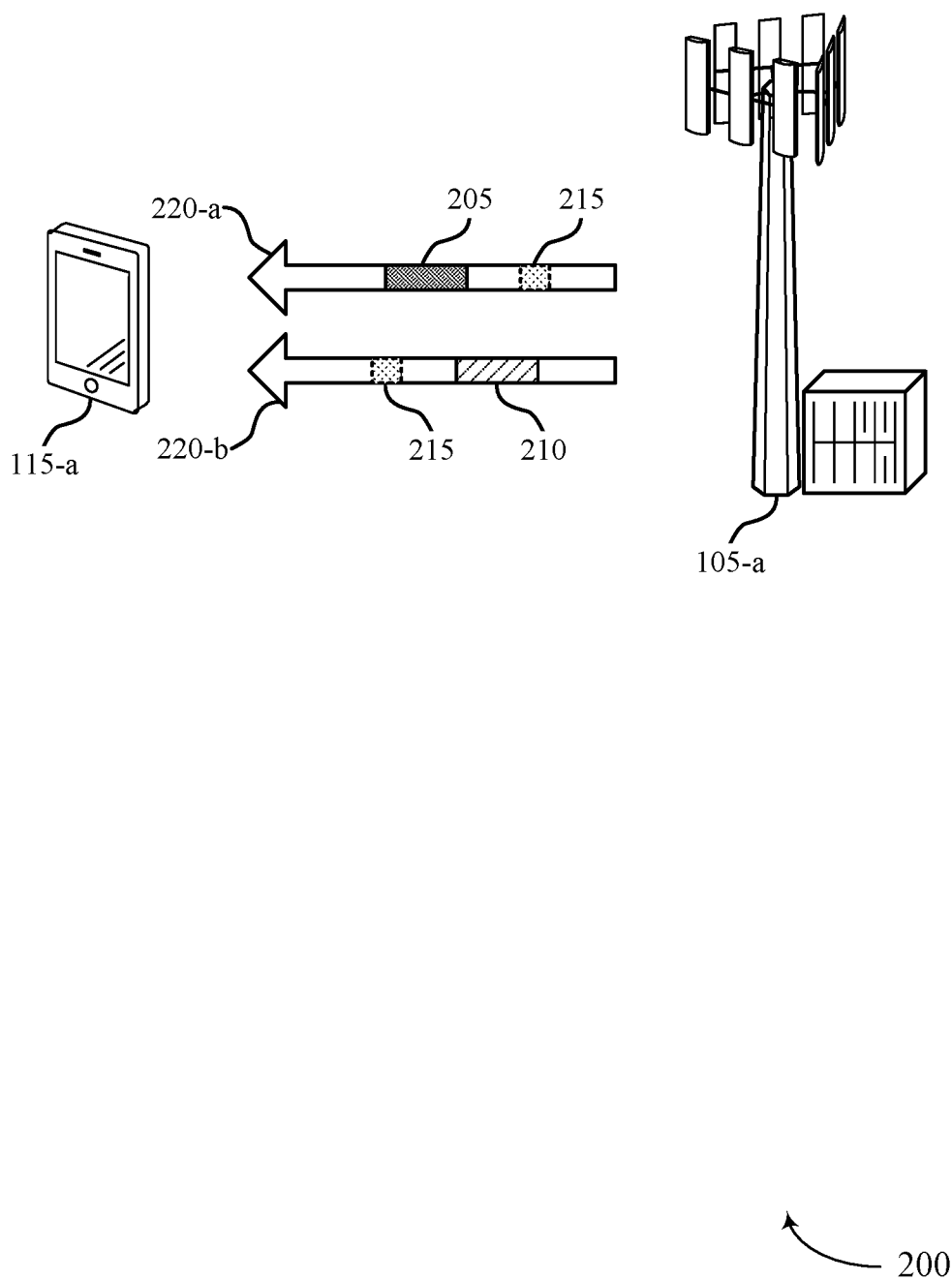
FIG. 2 illustrates an example of a wireless communications system that supports techniques for using an SSB for measurements in accordance with aspects of the present disclosure.

FIG. 2 illustrates an example of a wireless communications system 200 that supports techniques for using an SSB for measurements in accordance with aspects of the present disclosure. In some examples, wireless communications system 200 may implement aspects of wireless communications system 100. For example, wireless communications system 200 may include a base station 105-a and a UE 115-a, which may be examples of a base station 105 and a UE 115 as described with reference to FIG. 1. In some examples, UE 115-a may represent an example of a reduced-capability UE 115 (e.g., a low tier UE, an NR-light UE) that may operate with one or more of a reduced transmit power, a reduced number of transmit antennas, a reduced number of receive antennas, a reduced transmit/receive bandwidth, a reduced computational complexity, a reduced amount of available power, or any combination thereof. For example, a reduced capability UE may be a smart wearable device, an industrial sensor, a video surveillance device, or another device.

Base station 105-a may transmit one or more SSBs 205 to UE 115-a (e.g., may broadcast the one or more SSBs 205), and UE 115-a may decode or receive the one or more SSBs 205 in order to obtain system information and establish a communications link with base station 105-a. An SSB 205 may include one or more signals associated with a PBCH (e.g., including one or more broadcast signals, such as one or more information blocks and/or reference signals), one or more PSSs (e.g., primary synchronization signal), and one or more SSSs (e.g., secondary synchronization signal), which may be referred to as acquisition signals. The PSS, PBCH, and SSS may each occupy different symbols (e.g., orthogonal frequency division multiplexing (OFDM) symbols) and subcarriers of the SSB. The UE 115-a may use an SSB 205 to acquire downlink synchronization information and system information (e.g., to establish a communication link with base station 105-a). In some cases, UE 115-a may further use an SSB 205 (e.g., one or more measurements of an SSB or a signal thereof) to perform one or more management procedures. Examples of management procedures may include radio link monitoring (RLM), radio resource measurements (RRM), beam management, beam failure detection (BFD), or beam failure recovery (BFR).

A reduced-capability UE 115, such as UE 115-a, may operate in a narrow BWP 220-b after performing acquisition procedures in an initial BWP 220-a. In some cases, the narrow BWP 220-b and the initial BWP 220-a may be examples of a bandwidth region, which may include a narrow BWP, a BWP, or another grouping of frequency spectrum band. For example, UE 115-a may receive an SSB 205 from base station 105-a in the initial BWP 220-a, may establish a communication link with base station 105-a based on the SSB 205, and may switch to monitoring a narrow BWP 220-b. The narrow BWP 220-b, may represent, for example, a BWP 220 that occupies a smaller range of frequencies (e.g., a narrow range of frequencies) than one or more other BWPs 220. In some cases, the narrow BWP 220-b may represent a BWP 220 configured for use by a reduced-capability UE 115, such that the reduced-capability UE 115 may monitor a smaller range of frequencies, which may use less power at the UE 115.

In some cases, a narrow BWP 220-b may not include a frequency range for receiving an SSB 205 from base station 105-a, and UE 115-a may therefore be unable to perform one or more management procedures based on an SSB 205. The UE 115-a may, in some cases, switch to the initial BWP 220-a to receive the SSB 205 and perform one or more of the management procedures, but switching to the initial BWP 220-a may consume power and introduce a signaling gap. Base station 105-a may, in some cases, configure an SSB 205 for the narrow BWP 220-b used for communications between UE 115-a and base station 105-a, but doing so may increase overhead and resource use in the narrow BWP 220-b. In some cases, UE 115-a may perform a management procedure based on one or more reference signals, such as a channel state information reference signals (CSI-RS). In such cases, however, the reference signals may have a lower density in a narrow BWP 220-b and may result in lower quality measurements than an SSB 205.

The present disclosure provides techniques for base station 105-a to configure and transmit one or more lean SSBs 210, which may each include a first subset of signals (e.g., a PSS or an SSS) of an SSB 205 and may exclude a second subset of the signals (e.g., broadcast signals) of an SSB 205. A lean SSB 210 may be transmitted in a narrow BWP 220-b and may reduce overhead and resource use when compared with an SSB 205, while providing higher-density transmissions when compared with CSI-RS. Further, a lean SSB 210 may be configurable by base station 105-a and may be used as a default reference signal (e.g., because of a similar receive structure to an SSB 205) if no reference signal configuration is specified for the one or more management procedures at UE 115-a.

The UE 115-a may be configured to use a lean SSB 210 for one or more management procedures, which may result in higher quality measurements, reduced resource use, reduced power consumption, or a combination thereof. A lean SSB 210 may, in some cases, include one of either a PSS or an SSS transmitted over one symbol (e.g., an OFDM symbol), and may not include broadcast signals (e.g., transmitted via PBCH) such as a master information block, one or more system information blocks, or one or more reference signals. A lean SSB 210 that includes one of a PSS or an SSS may include, for example, include a number of resource blocks (RBs) (e.g., 12 RBs) transmitted over one symbol, compared to an SSB 205 that may include, for example, a higher number of RBs (e.g., 20 RBs) transmitted over multiple symbols.

In some cases, the narrow BWP 220-b used for communications between UE 115-a and base station 105-a may change frequency ranges (e.g., may "hop" in frequency) in order to decrease interference effects (e.g., interference experienced over some frequency ranges). In such cases, base station 105-a may configure one or more anchor BWPs 220, such that the one or more anchor BWPs 220 may each include a transmission of one or more lean SSBs 210. When the narrow BWP 220-b changes frequency ranges, the narrow BWP 220-b may, at some times, at least partially coincide with an anchor BWP 220 to support reception of a lean SSB 210 at UE 115-a, such that UE 115-a may receive (e.g., decode) and measure the lean SSB 210 and perform one or more management procedures based on the lean SSB 210.

Base station 105-a may transmit one or more indications to UE 115-a, such as via a configuration message 215 (e.g., transmitted via RRC signaling) or via multiple configuration messages 215. The configuration message may be transmitted via the initial BWP 220-a, the narrow BWP 220-b, or a combination thereof, and may configure UE 115-a with one or more parameters associated with lean SSBs 210. For example, the configuration message 215 may indicate for UE 115-a to perform one or more management procedures based on a lean SSB 210. In some cases, UE 115-a may be preconfigured to perform one or more management procedures based on a lean SSB 210 and based on UE 115-a being a reduced-capability UE 115. In some cases, the configuration message 215 may indicate one or more anchor BWPs and may indicate that the one or more anchor BWPs are associated with one or more lean SSBs 210 that are associated with the one or more management procedures.

In some cases, the configuration message 215 may include an indication of one or more parameters associated with the one or more management procedures for lean SSBs 210. For example, the configuration message 215 may include one or more indices for the lean SSBs 210 and associated with the one or more management procedures, may include one or more thresholds for the one or more management procedures, or a combination thereof, where the one or more indices and the one or more thresholds may apply to a management procedure associated with a lean SSB 210. In some cases, the configuration message 215 may indicate that a lean SSB 210 is a default transmission to be used for the one or more management procedures. The configuration message 215 may also include one or more parameters associated with a hopping configuration for the narrow BWP 220-b, and may include associated parameters for aligning (e.g., periodically aligning) at least a portion of the narrow BWP 220-b with an anchor BWP 220.

The UE 115-a may receive (e.g., decode) a lean SSB 210 in the narrow BWP 220-b (e.g., based on one or more indications of the configuration message 215), may perform one or more measurements of the lean SSB 210, and may perform one or more management procedures based on the one or more measurements. Doing so may increase communication quality and decrease delays associated with communications between UE 115-a and base station 105-a.

Figure 3:
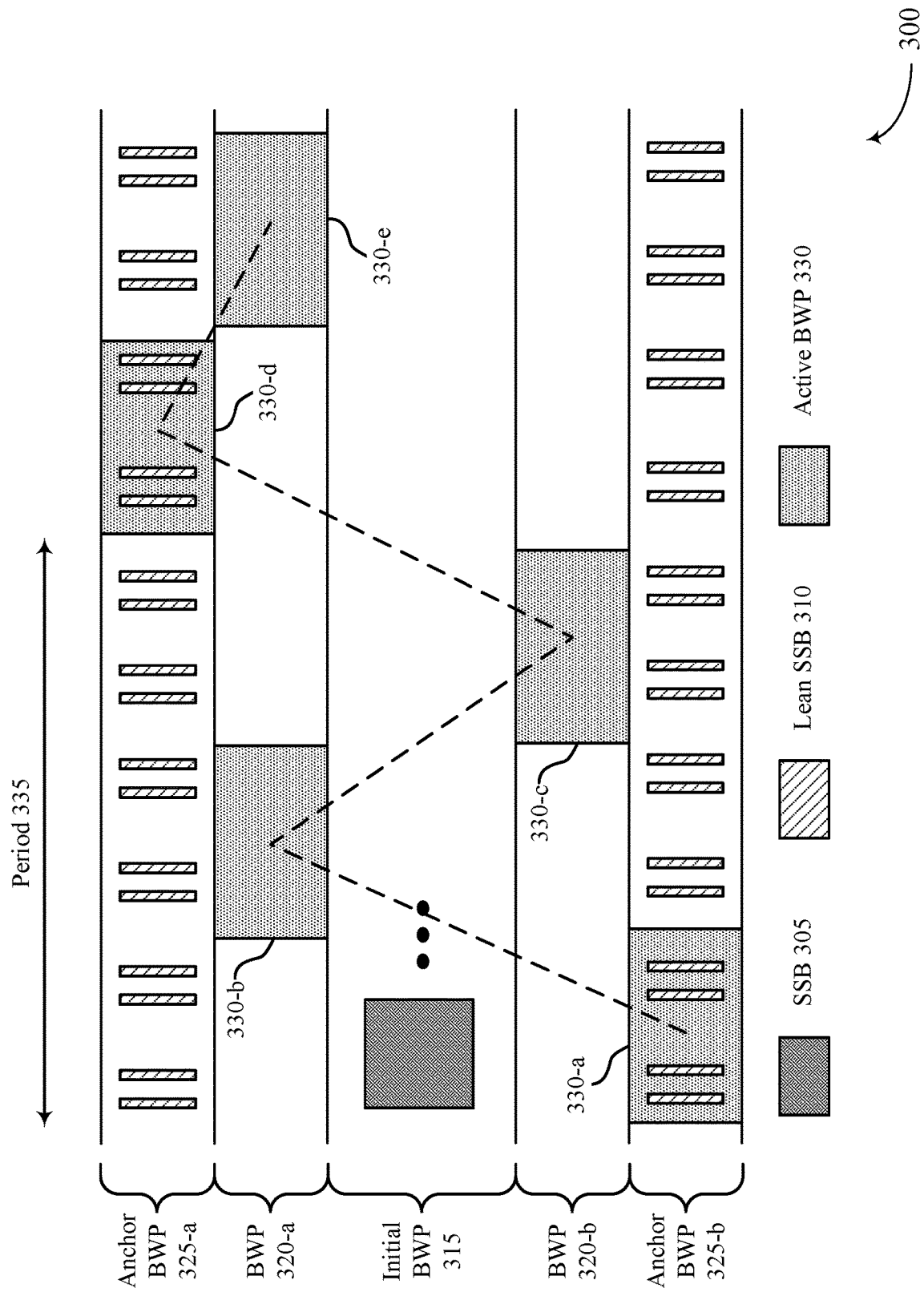
FIG. 3 illustrates an example of a signaling diagram that supports techniques for using an SSB for measurements in accordance with aspects of the present disclosure.

FIG. 3 illustrates an example of a signaling diagram 300 that supports techniques for using an SSB for measurements in accordance with aspects of the present disclosure. In some examples, signaling diagram 300 may implement aspects of wireless communications system 100 or 200. For example, signaling diagram 300 may illustrate one or more aspects of communications between a base station 105 and a UE 115, which may be examples of a base station 105 and a UE 115 described with reference to FIGS. 1 and 2. In some examples, the UE 115 may represent a reduced-capability UE 115, which may be configured to perform one or more management procedures based on a lean SSB 310.

The UE 115 may communicate with the base station 105 in a narrow BWP (e.g., an active BWP 330) after performing acquisition procedures in an initial BWP 315. For example, the UE 115 may receive an SSB 305 from the base station 105 in the initial BWP 315, may establish a communication link with the base station 105 based on the SSB 305, and may switch to monitoring a narrow, active BWP 330. In some cases, the active BWP 330 may not include a frequency range for receiving an SSB 305, and the UE 115 may use a lean SSB 310 to perform one or more management procedures. For example, the UE 115 may be configured (e.g., by the base station 105 or preconfigured) to use a lean SSB 310 for one or more management procedures if the active BWP 330 does not include a frequency range that fully includes the SSB 305 in the initial BWP 315. In some cases, the UE 115 may determine that the SSB 305 is not fully enclosed by the active BWP 330 and may use a lean SSB 310 to perform the one or more management procedures based on the determination. In some cases, the BWPs described with reference to FIG. 3 may be examples of a bandwidth region, which may include a narrow BWP, a BWP, or another grouping of frequency spectrum band.

In some cases, the active BWP 330 used for communications between the UE 115 and base station 105 may change frequency ranges (e.g., may "hop" in frequency), and the base station 105 may configure one or more anchor BWPs 325 to each include a transmission of one or more lean SSBs 310. The base station 105 may configure the one or more lean SSBs 310 to be used for one or more management procedures, and may signal an indication of the anchor BWPs 325 and associated lean SSBs 310 to the UE 115. When the active BWP 330 changes frequency ranges (e.g., hops or performs a hopping procedure), the active BWP 330 may, at some times, at least partially coincide with an anchor BWP 325 to support reception of a lean SSB 310 at the UE 115.

In one example, the active BWP 330 may be configured to sequentially change from active BWP 330-*a*, to active BWP 330-*b*, active BWP 330-*c*, active BWP 330-*d*, and then active BWP 330-*e*. Active BWP 330-*a* may at least partially coincide with anchor BWP 325-*b* and active BWP 330-*d* may at least partially coincide with anchor BWP 325-*a*, such that the UE 115 may receive one or more lean SSBs in active BWP 330-*a* and/or active BWP 330-*d*. In some cases, the UE 115 may perform a management procedure and the management procedure may be associated with a period 335. At a beginning of the period 335, the UE 115 may measure one or more first lean SSBs 310 and may perform the management procedure based on the one or more lean SSBs 310. At the end of the period 335, the procedure may restart, such that the UE may restart the period 335 and may measure one or more second lean SSBs 310. For example, at the beginning of the period 335 illustrated by FIG. 3, the active BWP 330-*a* may coincide with anchor BWP 325-*b* such that the UE 115 may measure one or more lean SSBs 310. Similarly, after the end of the period 335, the active BWP 330-*d* may coincide with anchor BWP 325-*a* such that the UE 115 may measure one or more lean SSBs 310.

The lean SSBs 310 may be configured such that the UE 115 may use a lean SSB 310 in any anchor BWP 325 to perform one of the management procedures. The one or more management procedures associated with the lean SSBs 310 may further be transparent to an anchor BWP 325 in which a lean SSB 310 is received. For example, the UE 115 may begin a management procedure by measuring one or more lean SSBs 310 in anchor BWP 325-*b* and may continue the management procedure by measuring one or more lean SSBs 310 in anchor BWP 325-*a*. In some cases, the measurement of the one or more SSBs 310 (e.g., in any anchor BWP 325) may include one or more measurements that are independent of frequency (e.g., a reference signal received power (RSRP) or a signal to interference plus noise ratio (SINR)), which may support performing a management procedure across multiple anchor BWPs 325 (e.g., a management procedure that is transparent to the anchor BWPs 325).

The base station 105 may further configure, de-configure, activate, de-activate, or modify the configuration of any anchor BWP 325 (e.g., via RRC signaling). The base station 105 may also change a frequency range for the anchor BWP 325, such that the anchor BWP may hop in frequency (e.g., the base station 105 may change a BWP 320 used as an anchor BWP 325 or configure a new BWP 320 to be an anchor BWP 325). The hopping of the anchor BWP 325 may be independent of any hopping performed by the active BWP 330 (e.g., an active BWP 330 hopping pattern) and may support reduced interference from inter-cell interference or narrowband interference. In some cases, the anchor BWP 325 may change frequency less frequently than an active BWP 330. The base station 105 may also change a configuration of one or more lean SSBs 310 transmitted in an anchor BWP 325 (e.g., via RRC signaling). For example, the base station may configure, change, activate, or deactivate a PSS or an SSS associated with the one or more lean SSBs 310, or may change a periodicity or a pattern of transmission of the one or more lean SSBs 310.

The base station 105 may also transmit, to the UE 115, signaling specific to the lean SSBs 310. The signaling (e.g., RRC signaling) may configure the UE 115 with one or more parameters for one or more management procedures performed using a lean SSB 310. For example, the signaling may indicate one or more indices (e.g., RadioLinkMonitoringRS, failureDetectionResources, beamFailureDetectionResourceList, candidateBeamRSList, or candidateBeamResourceList) to be used in association with performing the one or more management procedures using a lean SSB 310. The signaling may additionally or alternatively indicate one or more thresholds (e.g., $Q_{in}$, $Q_{out}$, $Q_{in,LR}$, or $Q_{out,LR}$) associated with the one or more management procedures, where the one or more thresholds may be specific to using lean SSBs 310.

In some cases, the UE 115 may be configured (e.g., preconfigured, such as according to a wireless standard) to use a lean SSB 310 as a default measurement for one or more management procedures if no explicit reference signal configuration is indicated to the UE 115. In some cases, the base station 105 may indicate that a lean SSB 310 is a default measurement associated with the one or more management procedures, for example, via a control resource set (CORESET) transmission configuration indicator (TCI) state, where the UE 115 may be preconfigured to use the default CORESET TCI state when no explicit reference signal configuration is indicated.

The UE 115 may also be configured (e.g., by the base station or preconfigured according to a standard) to identify aspects of one or more random access occasions and associated search space for BFR, when using a lean SSB 310 for BFR. For example, the UE 115 may be configured to identify that one or more random access occasions associated with BFR (e.g., provided by PRACH-ResourceDedicatedBFR) are configured to be quasi co-located (QCLed) with a lean SSB 310. The UE 115 may further be configured to identify that a control channel (e.g., a physical downlink control channel (PDCCH)) in a search space associated with the BFR (e.g., provided by recoverySearchSpaceId) and with the one or more random access occasions is configured to be QCLed with a lean SSB 310. The control channel and an associated shared channel (e.g., physical downlink shared channel (PDSCH)) may be configured for an acknowledgement of a random access procedure initiated via the one or more random access occasions.

Based on one or more of the techniques described herein, the UE 115 may receive (e.g., decode) a lean SSB 310 in an anchor BWP 325 (e.g., based on one or more configurations), may perform one or more measurements of the lean SSB 310, and may perform one or more management procedures based on the one or more measurements.

Figure 4:
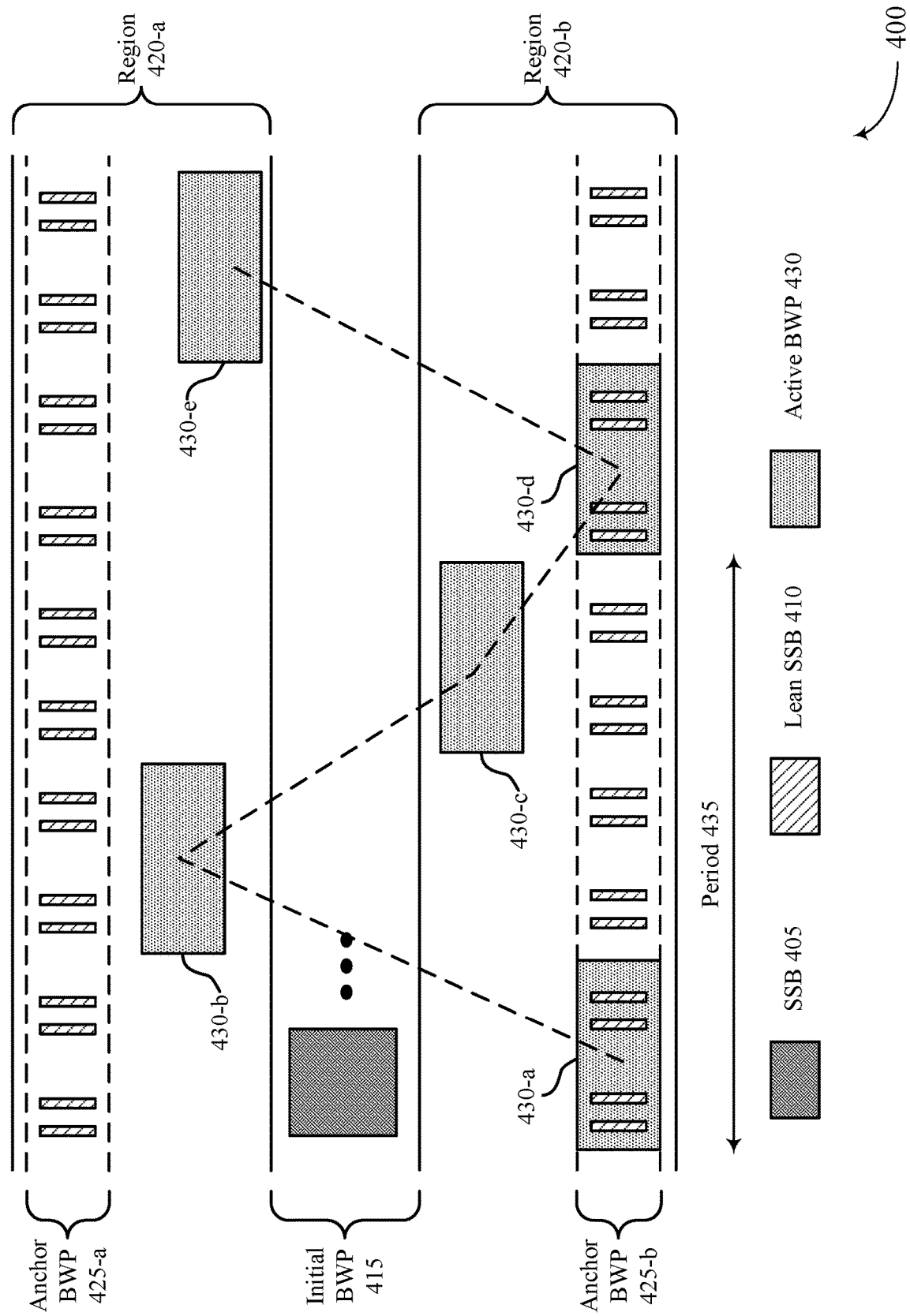
FIG. 4 illustrates an example of a signaling diagram that supports techniques for using an SSB for measurements in accordance with aspects of the present disclosure.

FIG. 4 illustrates an example of a signaling diagram 400 that supports techniques for using an SSB for measurements in accordance with aspects of the present disclosure. In some examples, signaling diagram 400 may implement aspects of wireless communications system 100 or 200. For example, signaling diagram 400 may illustrate one or more aspects of communications between a base station 105 and a UE 115, which may be examples of a base station 105 and a UE 115 described with reference to FIGS. 1-3. In some examples, the UE 115 may represent a reduced-capability UE 115, which may be configured to perform one or more management procedures based on a lean SSB 410.

The UE 115 may communicate with the base station in a narrow BWP (e.g., an active BWP 430) after performing acquisition procedures in an initial BWP 415. For example, the UE 115 may receive an SSB 405 from the base station 105 in the initial BWP 415, may establish a communication link with the base station 105 based on the SSB 405, and may switch to monitoring a narrow, active BWP 430. In some cases, the active BWP 430 may not include a frequency range for receiving an SSB 405, and the UE 115 may use a lean SSB 410 to perform one or more management procedures. In some cases, the active BWP 430 used for communications between the UE 115 and base station 105 may change frequency ranges (e.g., may "hop" in frequency), and the base station 105 may configure one or more anchor BWPs 425 to each include a transmission of one or more lean SSBs 410. In order to perform a management procedure based on a lean SSB 410, the active BWP 430 may, at some times, hop to at least partially coincide with an anchor BWP 425 to support reception of a lean SSB 410 at the UE 115. In some cases, the BWPs described with reference to FIG. 4 may be examples of a bandwidth region, which may include a narrow BWP, a BWP, or another grouping of frequency spectrum band.

In a first example, the base station 105 may support reception of a lean SSB 410 in an anchor BWP 425 (e.g., and coinciding active BWP 430) by configuring a hop pattern for the UE 115. The hop pattern may be configured such that the active BWP 430 at least partially coincides with an anchor BWP 425 periodically (e.g., in order to perform one or more management procedures), and the base station 105 may signal the hop pattern to the UE 115 via a configuration (e.g., via RRC signaling). In a second example, the UE may determine to change a frequency range of an active BWP 430 (e.g., may change an active BWP 430 of the UE 115) to at least partially coincide with an anchor BWP 425 according to a specified or configured periodicity (e.g., in order to perform one or more management procedures). For example, a timer may expire (e.g., indicating for the UE 115 to receive a lean SSB 410 to perform a management procedure) and the UE 115 may change an active BWP 430 in order to at least partially coincide with an anchor BWP 425 and receive a lean SSB 410.

In one example, the active BWP 430 may be configured to sequentially change from active BWP 430-a, to active BWP 430-b, active BWP 430-c, active BWP 430-d, and then active BWP 430-e. Active BWPs 430-a and 430-d may at least partially coincide with anchor BWP 425-b, such that the UE 115 may receive one or more lean SSBs 410 in active BWP 430-a and/or active BWP 430-d. The active BWP 430 may change based on a hop pattern configured by the base station 105, or based on a determination made by the UE 115.

In some cases, the UE 115 may perform a management procedure that may be associated with a period 435. At a beginning of the period 435, the UE 115 may measure one or more first lean SSBs 410 and may perform the management procedure based on the one or more lean SSBs 410. At the end of the period 435 (e.g., based on a timer, for example, as configured by the base station 105), the procedure may restart, such that the UE may restart the period 435 and may measure one or more second lean SSBs 410. For example, at the beginning of the period 435 illustrated by FIG. 4 the active BWP 430-a may coincide with anchor BWP 425-b such that the UE 115 may measure one or more lean SSBs 410. Similarly, after the end of the period 435, the active BWP 430-d may coincide with anchor BWP 425-b such that the UE 115 may measure one or more lean SSBs 410. As described herein, active BWPs 430-a and 430-d may be based on a pattern configured by the base station 105 or based on a determination by the UE 115.

If the UE 115 determines to change an active BWP 430 to at least partially coincide with an anchor BWP 425, the UE 115 may determine to hop to an anchor BWP 425 based on a rule or a configuration. In a first example, the UE 115 may determine to hop to an anchor BWP 425 closest to a current active BWP 430 when a timer expires indicating that a lean SSB-based management procedure is to be performed (e.g., indicating a beginning of a new period 435). In a second example, the UE 115 may determine to hop to an anchor BWP 425 according to a specified (e.g., signaled) hopping pattern in one or more anchor BWPs 425 (e.g., that contain lean SSB 410 transmissions). In a third example, one or more regions 420 may be defined (e.g., by the base station 105 or according to a wireless communications standard) such that each region 420 may include an anchor BWP 425. The UE 115 may determine to hop to an anchor BWP 425 in a region 420 associated with an active BWP 430 when a timer expires indicating that a lean SSB-based management procedure is to be performed (e.g., indicating a beginning of a new period 435). For example, a timer may expire when active BWP 430-c is being used for communications between the UE 115 and the base station 105, and the UE 115 may determine to switch to active BWP 430-d based on active BWP 430-c being included in region 420-b.

In any of the examples described herein, the periodicity of coinciding with an anchor BWP 425 may be based on a length of time of one or more active BWPs 430 (e.g., a hop window width), as well as a value of a respective timer defining a length of one or more management procedure periods 435. Based on one or more of the techniques described herein, the UE 115 may periodically receive (e.g., decode) a lean SSB 410 in an anchor BWP 425 (e.g., based on an active BWP switch or change), may perform one or more measurements of the lean SSB 410, and may perform one or more management procedures based on the one or more measurements.

Figure 5:
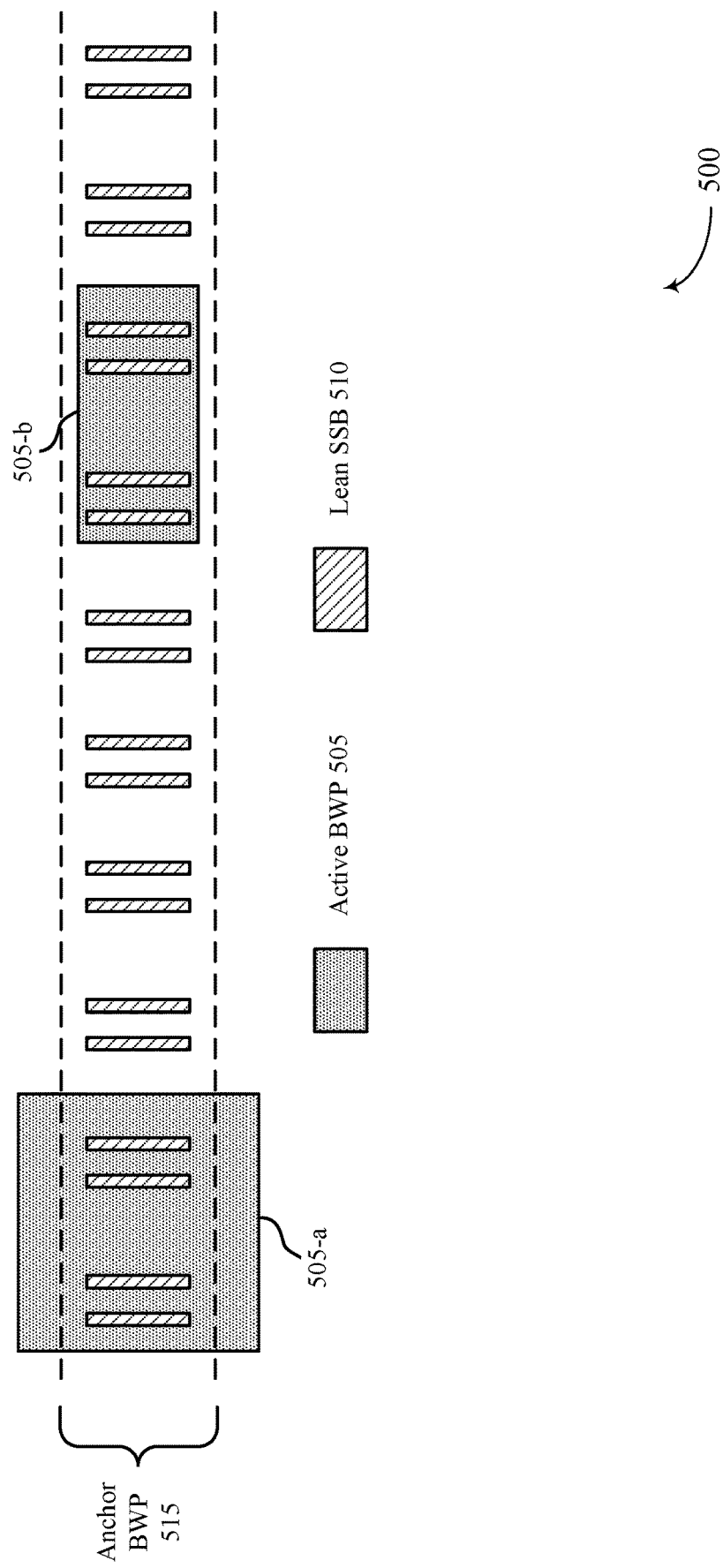
FIG. 5 illustrates an example of a signaling diagram that supports techniques for using an SSB for measurements in accordance with aspects of the present disclosure.

FIG. 5 illustrates an example of a signaling diagram 500 that supports techniques for using an SSB for measurements in accordance with aspects of the present disclosure. In some examples, signaling diagram 500 may implement aspects of wireless communications system 100 or 200. For example, signaling diagram 500 may illustrate one or more aspects of communications between a base station 105 and a UE 115, which may be examples of a base station 105 and a UE 115 described with reference to FIGS. 1-4. In some examples, the UE 115 may represent a reduced-capability UE 115, which may be configured to perform one or more management procedures based on a lean SSB 510.

As described herein, the UE 115 may communicate with the base station in a narrow BWP (e.g., an active BWP 505) after performing acquisition procedures in an initial BWP. In some cases, the active BWP 505 may not include a frequency range for receiving an SSB, and the UE 115 may use a lean SSB 510 to perform one or more management procedures. In some cases, the active BWP 505 used for communications between the UE 115 and base station 105 may change frequency ranges (e.g., may "hop" in frequency), and the base station 105 may configure one or more anchor BWPs 515 to each include a transmission of one or more lean SSBs 510. In order to perform a management procedure based on a lean SSB 510, the active BWP 505 may, at some times, hop to at least partially coincide with an anchor BWP 515 to support reception of a lean SSB 510 at the UE 115. In some cases, the BWPs described with reference to FIG. 5 may be examples of a bandwidth region, which may include a narrow BWP, a BWP, or another grouping of frequency spectrum band.

In some cases, a bandwidth of an anchor BWP 515 used to receive a lean SSB 510 may be different than a bandwidth of an active BWP 505 used for communications between the UE 115 and the base station 105, for example, as illustrated by FIG. 5. Some rules may be defined (e.g., by the base station 105 or according to a wireless communications standard) such that the active BWP 505 may fully include a lean SSB 510 when the active BWP 505 is used to receive a lean SSB 510. For example, one or more rules may define an offset between a reference frequency of the active BWP 505 and a reference frequency of the anchor BWP 515, or an offset between a reference frequency of the active BWP 505 and a reference frequency of one or more lean SSBs 510.

The reference frequency of the active BWP 505, of the anchor BWP 515, or of the one or more lean SSBs 510 may be a highest frequency, a lowest frequency, a middle frequency, a frequency range, or any combination thereof. The reference frequency of the active BWP 505, of the anchor BWP 515, or of the one or more lean SSBs 510 may be signaled to the UE 115 by the base station 105 (e.g., via RRC signaling) or the UE 115 may be preconfigured with a respective reference frequency (e.g., according to a wireless communications standard). The respective reference frequencies and offset may be configured such that the active BWP 505 may fully include a lean SSB 510 when the active BWP 505 is used to receive a lean SSB 510. For example, the respective reference frequencies may include a lowest frequency of the active BWP 505 and a lowest frequency of the anchor BWP 515 or of the one or more lean SSBs 510. The offset may be configured such that a spacing between the lowest frequencies of the active BWP 505 and the anchor BWP 515 or the one or more lean SSBs 510 aligns the active BWP 505 to support reception of one or more lean SSBs 510 in the anchor BWP 515.

Based on the techniques described herein, the UE 115 may receive (e.g., decode) a lean SSB 510 in an anchor BWP 515 (e.g., based on an active BWP switch or change), may perform one or more measurements of the lean SSB 510, and may perform one or more management procedures based on the one or more measurements.

Figure 6:
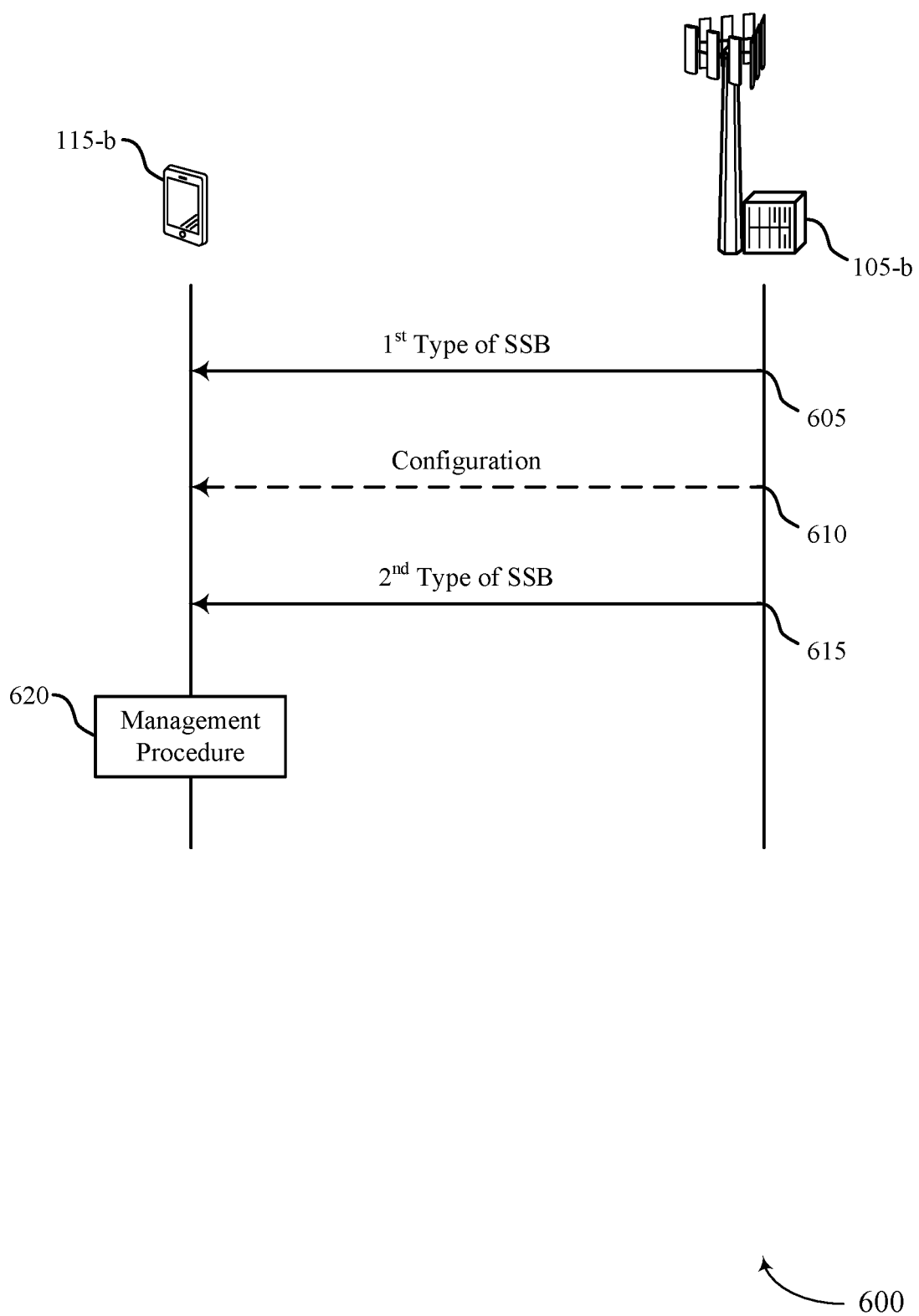
FIG. 6 illustrates an example of a process flow that supports techniques for using an SSB for measurements in accordance with aspects of the present disclosure.

FIG. 6 illustrates an example of a process flow 600 that supports techniques for using an SSB for measurements in accordance with aspects of the present disclosure. In some examples, process flow 600 may implement or be implemented by aspects of wireless communications system 100 or 200. Process flow 600 may also implement or be implemented by aspects of signaling diagrams 300, 400, or 500. For example, process flow 600 may illustrate one or more aspects of communications between a base station 105-b and a UE 115-b, which may be examples of a base station 105 and a UE 115 described with reference to FIGS. 1-5. In some examples, UE 115-b may represent a reduced-capability UE 115, which may be configured to perform one or more management procedures based on a lean SSB.

In the following description of process flow 600, the operations between UE 115-b and base station 105-b may be transmitted in a different order than the order shown, or the operations performed by UE 115-b and base station 105-b may be performed in different orders or at different times. For example, some operations may also be left out of process flow 600, or other operations may be added to process flow 600. Although UE 115-b and base station 105-b are shown performing the operations of process flow 600, some aspects of some operations may also be performed by one or more other wireless devices.

At 605, UE 115-b may receive, from base station 105-b and in a first bandwidth region (e.g., an initial BWP), a first type of SSB including one or more broadcast signals, one or more first synchronization signals, and one or more second synchronization signals. The first type of SSB may represent an SSB as described herein, and base station 105-b may broadcast the first type of SSB (e.g., periodically) in the initial BWP for use in acquisition procedures and in performing one or more management procedures. As described herein, a bandwidth region may represent a range of frequencies, a BWP, a narrow BWP, a carrier, or any combination thereof. In some cases, the BWPs described with reference to FIG. 6 may be examples of a bandwidth region, which may include a narrow BWP, a BWP, or another grouping of frequency spectrum band.

At 610, in some cases, base station 105-b may transmit (e.g., via RRC signaling), to UE 115-b a configuration message associated with a second type of SSB (e.g., a lean SSB). For example, the configuration message may include an indication that UE 115-b is to perform one or more management procedures based on the second type of SSB. In some cases, the configuration message may indicate one or more lean SSB-related parameters associated with performing the one or more management procedures, or may indicate a default lean SSB configuration. In some cases, the configuration message may indicate one or more anchor BWPs, or may configure UE 115-b with a hopping pattern of an active BWP. In some cases, the configuration message may indicate a method for aligning (e.g., at least partially aligning) an active BWP used by UE 115-b and base station 105-b with an anchor BWP that includes transmissions of the second type of SSB.

In some cases, the configuration message may indicate a change in a configuration of an anchor BWP or of one or more lean SSBs. In some cases, the configuration message may indicate a QCL property of one or more random access occasions and one or more search spaces associated with a management procedure of the one or more management procedures. In some cases, UE 115-b may be preconfigured (e.g., according to a wireless standard) with one or more of the parameters that may be indicated via the configuration message.

At 615, UE 115-b may receive, from base station 105-b and in a second bandwidth region (e.g., an anchor BWP), a second type of SSB (e.g., a lean SSB) that includes a first subset of signals (e.g., a PSS or SSS) of the first type of SSB and excludes a second subset of signals (e.g., broadcast signals) of the first type of SSB. The UE 115-b may receive the second type of SSB according to one or more techniques described herein (e.g., with reference to one or more of FIGS. 3-5).

At 620, UE 115-b may perform a management procedure for a communication link between UE 115-b and base station 105-b based on receiving the second type of SSB. For example, UE 115-b may perform one or more measurements of the second type of SSB and may perform the management procedure based on the one or more measurements. The management procedure may include an RLM procedure, an RRM procedure, a beam management procedure, a BFD procedure, a BFR procedure, or any combination thereof.

Figure 7:
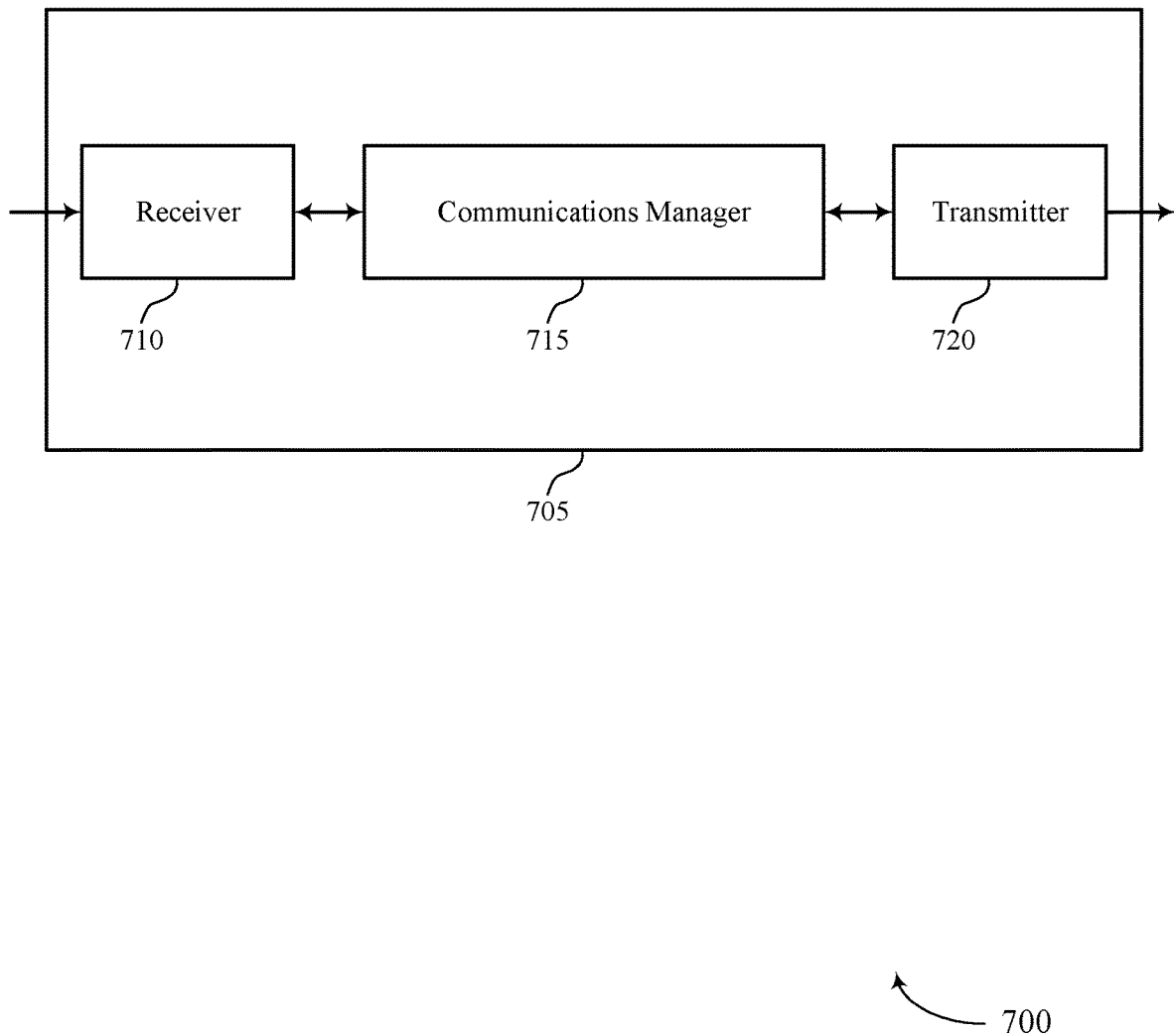
FIGS. 7 and 8 show block diagrams of devices that support techniques for using an SSB for measurements in accordance with aspects of the present disclosure.

FIG. 7 shows a block diagram 700 of a device 705 that supports techniques for using an SSB for measurements in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for using an SSB for measurements). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station and in a first bandwidth region, a first type of SSB including one or more broadcast signals, one or more first synchronization signals, and one or more second synchronization signals, receive, in a second bandwidth region, a second type of SSB that includes a first subset of signals of the first type of SSB and excludes a second subset of signals of the first type of SSB, and perform a management procedure for a communication link between the UE and the base station based on receiving the second type of SSB. The communications manager 715 may be an example of aspects of the communications manager 1010 described herein.

The communications manager 715, or its sub-components, may be implemented in hardware, code (e.g., software) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

The actions performed by the communications manager 715, among other examples herein, may be implemented to realize one or more potential advantages. For example, communications manager 715 may increase communication quality and throughput at a wireless device (e.g., a UE 115) by supporting link management techniques for communications between a UE and a base station. The increase in the uplink transmission occasion density may result in increased communication quality or throughput (or any combination thereof) due to an increased link performance based on performing one or more link management techniques. Accordingly, communications manager 715 may save power and increase battery life at a wireless device (e.g., a UE 115) by strategically increasing a quality of communications at a wireless device (e.g., a UE 115).

Figure 8:
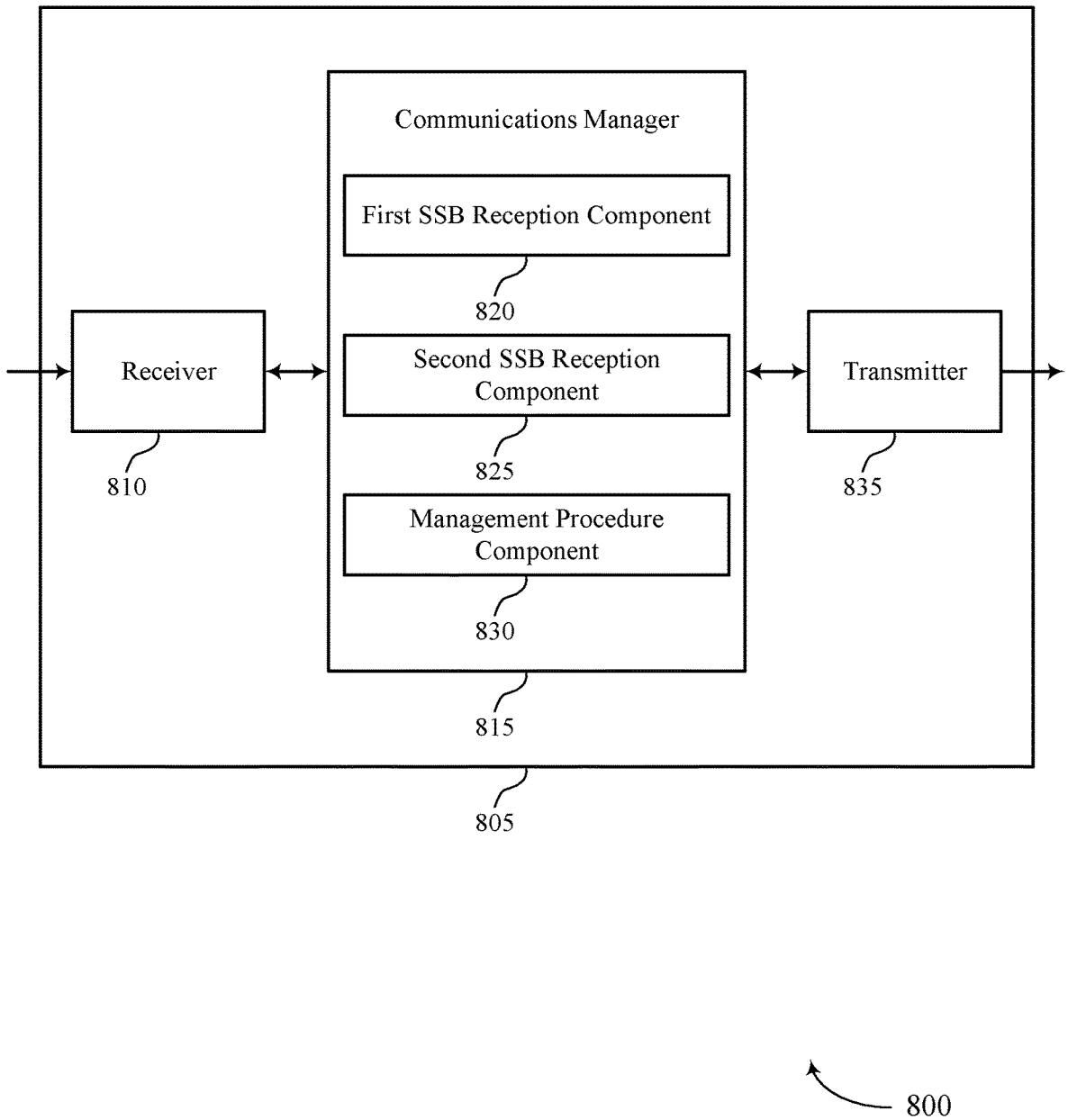

FIG. 8 shows a block diagram 800 of a device 805 that supports techniques for using an SSB for measurements in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to techniques for using an SSB for measurements). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a first SSB reception component 820, a second SSB reception component 825, and a management procedure component 830. The communications manager 815 may be an example of aspects of the communications manager 1010 described herein.

The first SSB reception component 820 may receive, from a base station and in a first bandwidth region, a first type of SSB including one or more broadcast signals, one or more first synchronization signals, and one or more second synchronization signals.

The second SSB reception component 825 may receive, in a second bandwidth region, a second type of SSB that includes a first subset of signals of the first type of SSB and excludes a second subset of signals of the first type of SSB.

The management procedure component 830 may perform a management procedure for a communication link between the UE and the base station based on receiving the second type of SSB.

The transmitter 835 may transmit signals generated by other components of the device 805. In some examples, the transmitter 835 may be collocated with a receiver 810 in a transceiver component. For example, the transmitter 835 may be an example of aspects of the transceiver 1020 described with reference to FIG. 10. The transmitter 835 may utilize a single antenna or a set of antennas.

A processor of a wireless device (e.g., controlling the receiver 810, the transmitter 835, or the transceiver 1020 as described with reference to FIG. 10) may increase communication reliability, quality, and throughput. The increased communication quality and throughput may reduce power consumption (e.g., via implementation of system components described with reference to FIG. 9) compared to other systems and techniques, for example, that do not support some link management techniques for communications between a UE and a base station, which may decrease communication quality and increase power consumption. Further, the processor of the UE 115 may identify one or more aspects of a lean SSB or an anchor BWP to perform some of the techniques described herein. The processor of the wireless device may use the lean SSB or the anchor BWP to perform one or more actions that may result in increased communication quality and power consumption, as well as save power and increase battery life at the wireless device (e.g., by strategically supporting link management processes, which may increase communication quality), among other benefits.

Figure 9:
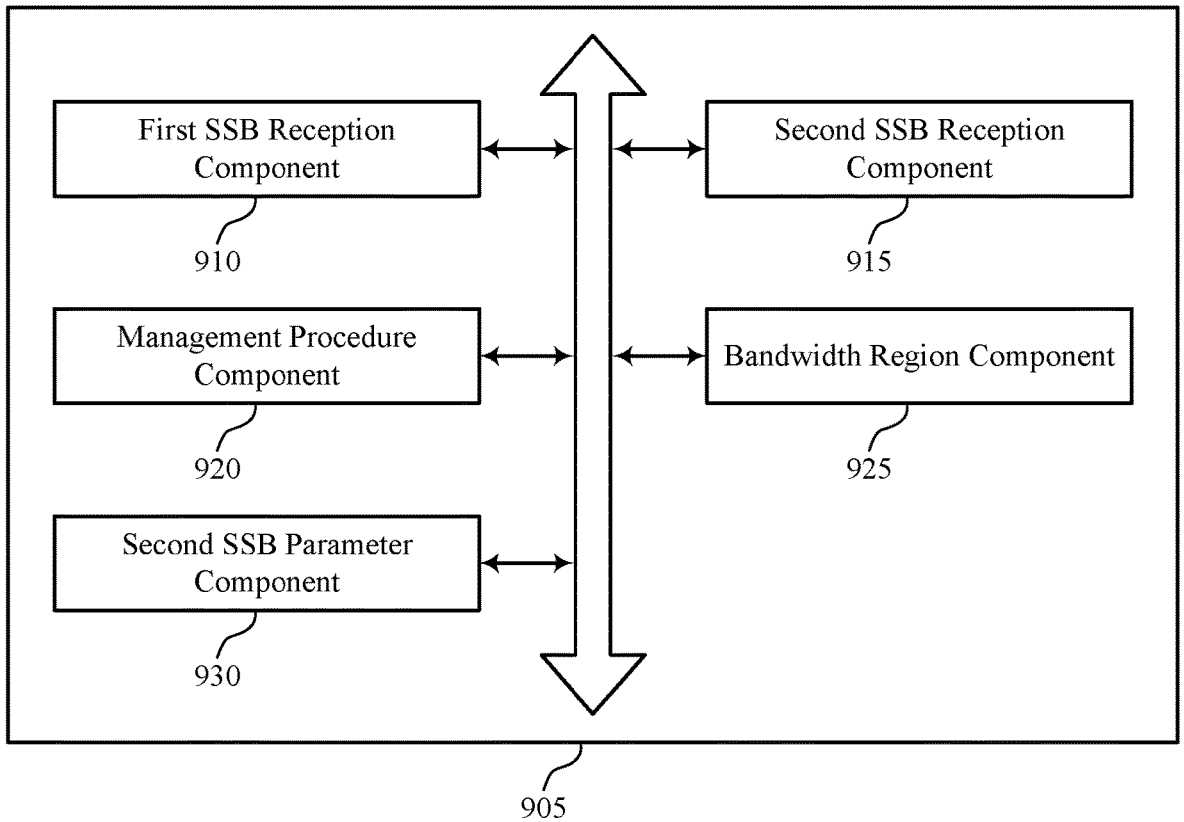
FIG. 9 shows a block diagram of a communications manager that supports techniques for using an SSB for measurements in accordance with aspects of the present disclosure.

FIG. 9 shows a block diagram 900 of a communications manager 905 that supports techniques for using an SSB for measurements in accordance with aspects of the present disclosure. The communications manager 905 may be an example of aspects of a communications manager 715, a communications manager 815, or a communications manager 1010 described herein. The communications manager 905 may include a first SSB reception component 910, a second SSB reception component 915, a management procedure component 920, a bandwidth region component 925, and a second SSB parameter component 930. Each of these components may communicate, directly or indirectly, with one another (e.g., via one or more buses).

The first SSB reception component 910 may receive, from a base station and in a first bandwidth region, a first type of SSB including one or more broadcast signals, one or more first synchronization signals, and one or more second synchronization signals.

The second SSB reception component 915 may receive, in a second bandwidth region, a second type of SSB that includes a first subset of signals of the first type of SSB and excludes a second subset of signals of the first type of SSB. In some cases, the second subset of signals excluded from the second type of SSB includes the one or more broadcast signals, and where the one or more broadcast signals include one or more reference signals and one or more information blocks transmitted via a broadcast channel. In some cases, the first subset of signals of the second type of SSB includes a first synchronization signal of the one or more first synchronization signals or a second synchronization signal of the one or more second synchronization signals.

The management procedure component 920 may perform a management procedure for a communication link between the UE and the base station based on receiving the second type of SSB. In some cases, the management procedure includes an RLM procedure, an RRM procedure, a beam management procedure, a BFD procedure, a BFR procedure, or any combination thereof.

The bandwidth region component 925 may determine that a bandwidth region used for communications with the base station excludes at least a portion of a bandwidth associated with the first type of SSB, where receiving the second type of SSB is based on determining that the bandwidth region used for communications with the base station excludes the at least the portion of the bandwidth associated with the first type of SSB. In some examples, the bandwidth region component 925 may receive, from the base station, an indication that the second type of SSB is transmitted in the second bandwidth region, where receiving the second type of SSB is based on receiving the indication that the second type of SSB is transmitted in the second bandwidth region.

In some examples, the bandwidth region component 925 may receive, from the base station, an indication that the second bandwidth region is associated with one or more management procedures for the communication link between the UE and the base station that include the management procedure, where performing the management procedure is based on receiving the indication that the second bandwidth region is associated with the one or more management procedures. In some examples, the bandwidth region component 925 may receive, from the base station, an indication that the second type of SSB is transmitted in one or more bandwidth regions that include the second bandwidth region.

In some examples, the bandwidth region component 925 may perform the management procedure is independent of whether the second type of SSB is received in the second bandwidth region, is received in a different bandwidth region of one or more additional bandwidth regions, or any combination thereof. In some examples, the bandwidth region component 925 may receive, from the base station, an indication that one or more additional bandwidth regions are associated with one or more management procedures for the communication link between the UE and the base station that include the management procedure.

In some examples, the bandwidth region component 925 may monitor at least a portion of the second bandwidth region according to a periodicity, where receiving the second type of SSB is based on monitoring the second bandwidth region according to the periodicity. In some examples, the bandwidth region component 925 may receive, from the base station, a pattern for monitoring one or more bandwidth regions, where monitoring the second bandwidth region according to the periodicity is based on the pattern for monitoring the one or more bandwidth regions. In some examples, the bandwidth region component 925 may receive, from the base station, one or more parameters associated with the periodicity and one or more parameters for identifying the second bandwidth region. In some examples, the bandwidth region component 925 may identify a value of a timer associated with the periodicity based on receiving the one or more parameters associated with the periodicity. In some examples, the bandwidth region component 925 may monitor the at least the portion of the second bandwidth region based on the value of the timer and the one or more parameters for identifying the second bandwidth region.

In some examples, the bandwidth region component 925 may identify, based on the one or more parameters for identifying the second bandwidth region, that the second bandwidth region is closer to an active bandwidth region currently used by the UE than one or more other bandwidth regions associated with transmitting the second type of SSB, where monitoring the at least the portion of the second bandwidth region is based on identifying that the second bandwidth region is closer to the active bandwidth region currently used by the UE than the one or more other bandwidth regions.

In some examples, the bandwidth region component 925 may identify, based on the one or more parameters for identifying the second bandwidth region, a pattern for monitoring one or more bandwidth regions used for transmitting the second type of SSB, where monitoring the at least the portion of the second bandwidth region is based on identifying the pattern for monitoring one or more other bandwidth regions. In some examples, the bandwidth region component 925 may identify, based on the one or more parameters for identifying the second bandwidth region, a group of one or more bandwidth regions including an active bandwidth region of the UE and the second bandwidth region, where monitoring the at least the portion of the second bandwidth region is based on identifying the group of one or more bandwidth regions.

In some examples, the bandwidth region component 925 may receive, from the base station, an indication of a pattern of a bandwidth region used to transmit the second type of SSB, the pattern of the bandwidth region corresponding to one or more parameters independent of a frequency monitoring pattern at the UE, where receiving the second type of SSB is based on the indication of the pattern of the bandwidth region used to transmit the second type of SSB. In some examples, the bandwidth region component 925 may receive, from the base station, an indication of a change in a configuration for one or more bandwidth regions used to transmit the second type of SSB, where receiving the second type of SSB is based on the change in the configuration for the one or more bandwidth regions used to transmit the second type of SSB.

In some examples, the bandwidth region component 925 may receive, from the base station, an indication of one or more parameters defining an offset between a frequency location of an active bandwidth region of the UE and a frequency location of the second type of SSB, a frequency location of the second bandwidth region, or any combination thereof, where receiving the second type of SSB is based on the one or more parameters defining the offset. In some cases, the first bandwidth region and the second bandwidth region include BWPs, narrow BWPs, or any combination thereof.

The second SSB parameter component 930 may receive, from the base station, an indication of one or more parameters associated with the second type of SSB and with one or more management procedures for the communication link between the UE and the base station that include the management procedure, where performing the management procedure is based on receiving the indication of the one or more parameters. In some examples, the second SSB parameter component 930 may identify a default configuration for performing the management procedure based on using the second type of SSB, where performing the management procedure is based on identifying the default configuration for performing the management procedure based on the second type of SSB.

In some examples, the second SSB parameter component 930 may identify that one or more random access occasions associated with the management procedure are configured to be QCLed with the second type of SSB. In some examples, the second SSB parameter component 930 may identify that one or more search spaces associated with the management procedure are configured to be QCLed with the second type of SSB. In some examples, the second SSB parameter component 930 may receive, from the base station, an indication of a change in a configuration for the second type of SSB in the second bandwidth region, where receiving the second type of SSB is based on the change in the configuration for the second type of SSB in the second bandwidth region. In some cases, the one or more parameters include one or more indices of the second type of SSB, one or more thresholds associated with the one or more management procedures, or any combination thereof.

Figure 10:
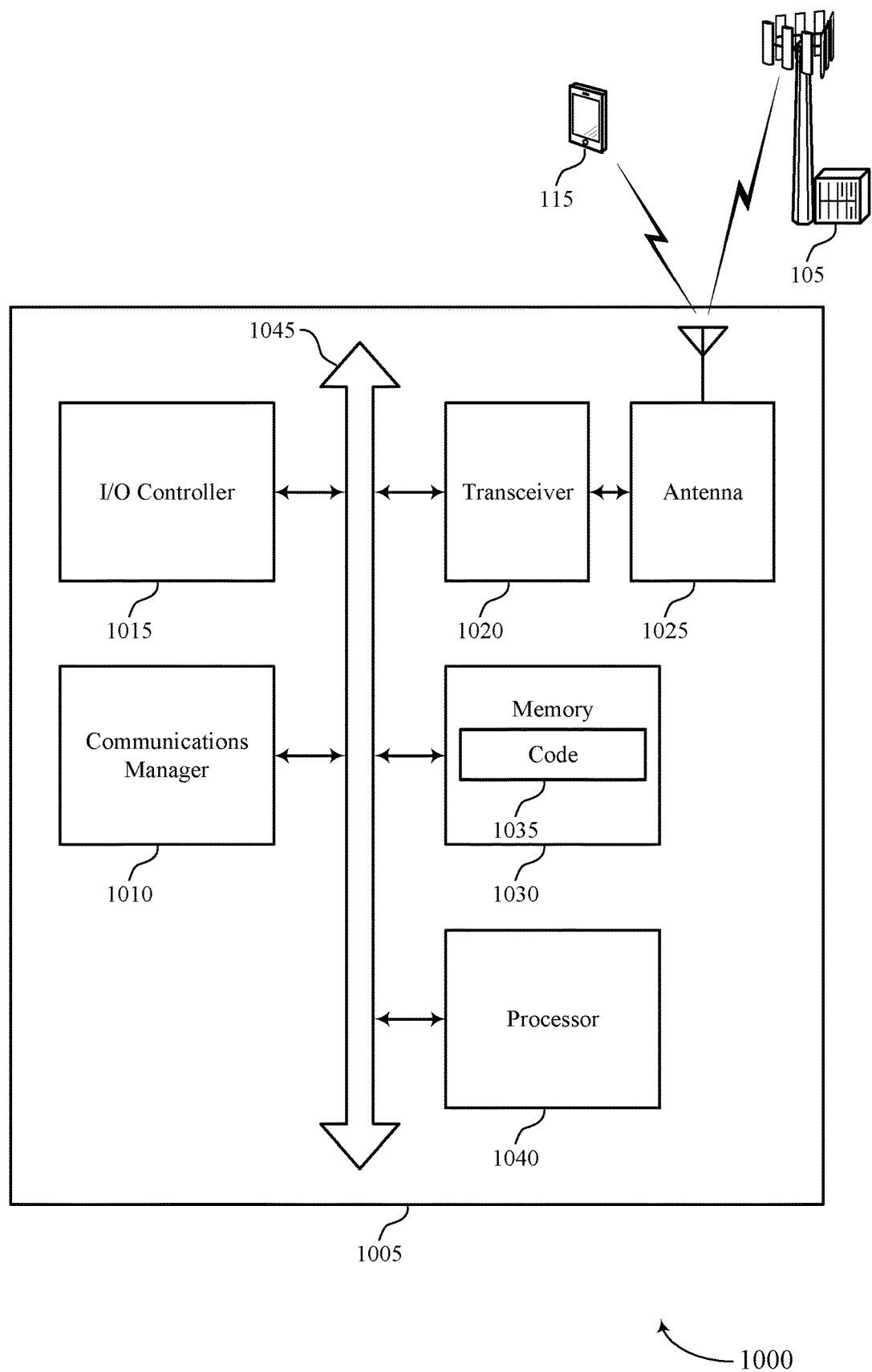
FIG. 10 shows a diagram of a system including a device that supports techniques for using an SSB for measurements in accordance with aspects of the present disclosure.

FIG. 10 shows a diagram of a system 1000 including a device 1005 that supports techniques for using an SSB for measurements in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be coupled via one or more buses (e.g., bus 1045). Components in a wireless communication system may be coupled (for example, operatively, communicatively, functionally, electronically, and/or electrically) to each other.

The communications manager 1010 may receive, from a base station and in a first bandwidth region, a first type of SSB including one or more broadcast signals, one or more first synchronization signals, and one or more second synchronization signals, receive, in a second bandwidth region, a second type of SSB that includes a first subset of signals of the first type of SSB and excludes a second subset of signals of the first type of SSB, and perform a management procedure for a communication link between the UE and the base station based on receiving the second type of SSB.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for using an SSB for measurements).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
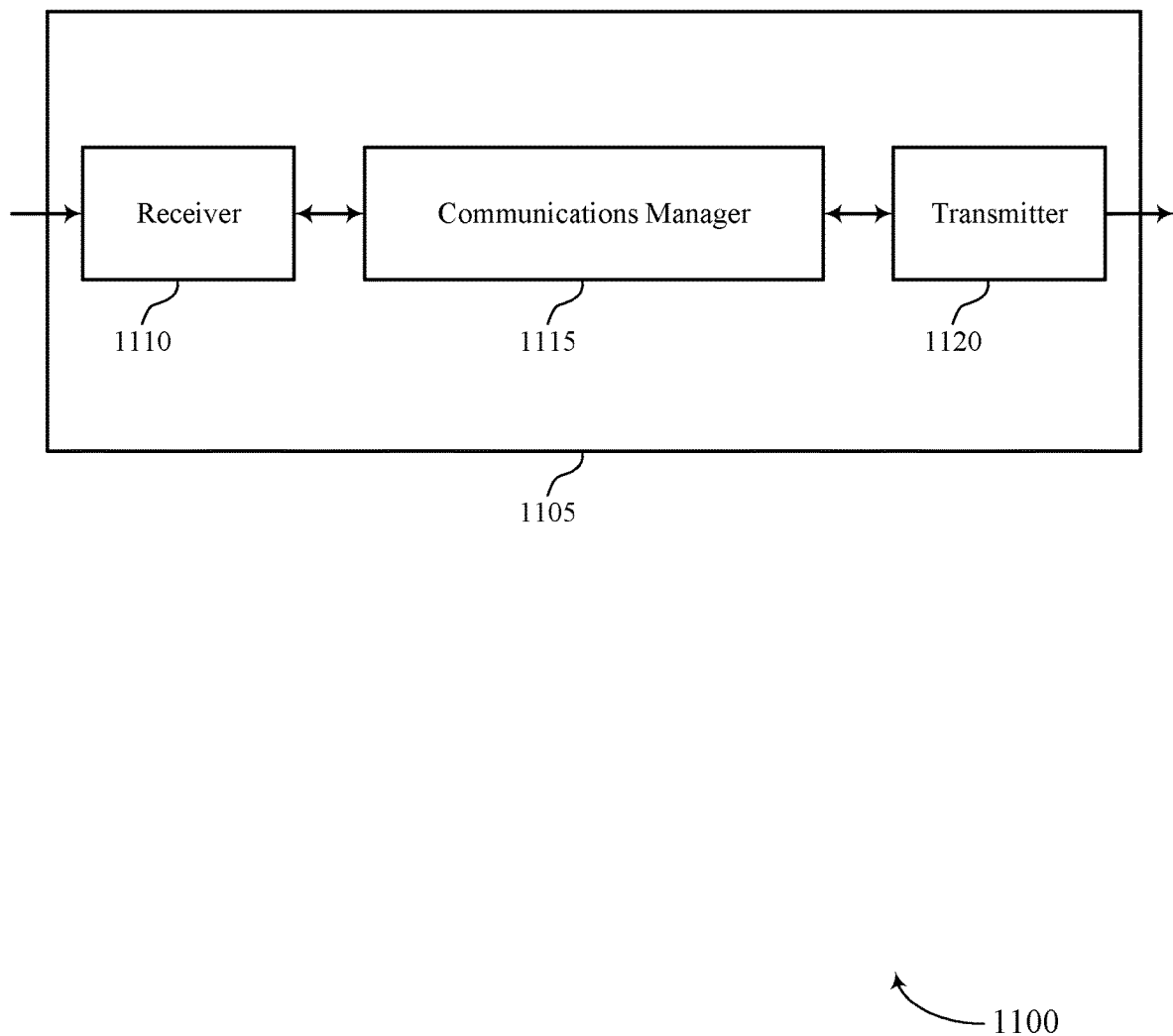
FIGS. 11 and 12 show block diagrams of devices that support techniques for using an SSB for measurements in accordance with aspects of the present disclosure.

FIG. 11 shows a block diagram 1100 of a device 1105 that supports techniques for using an SSB for measurements in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for using an SSB for measurements). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, in a first bandwidth region, a first type of SSB including one or more broadcast signals, one or more first synchronization signals, and one or more second synchronization signals and transmit, in a second bandwidth region, a second type of SSB that includes a first subset of signals of the first type of SSB and excludes a second subset of signals of the first type of SSB, where a management procedure for a communication link between a UE and the base station is based on the second type of SSB. The communications manager 1115 may be an example of aspects of the communications manager 1410 described herein.

The communications manager 1115, or its sub-components, may be implemented in hardware, code (e.g., software) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
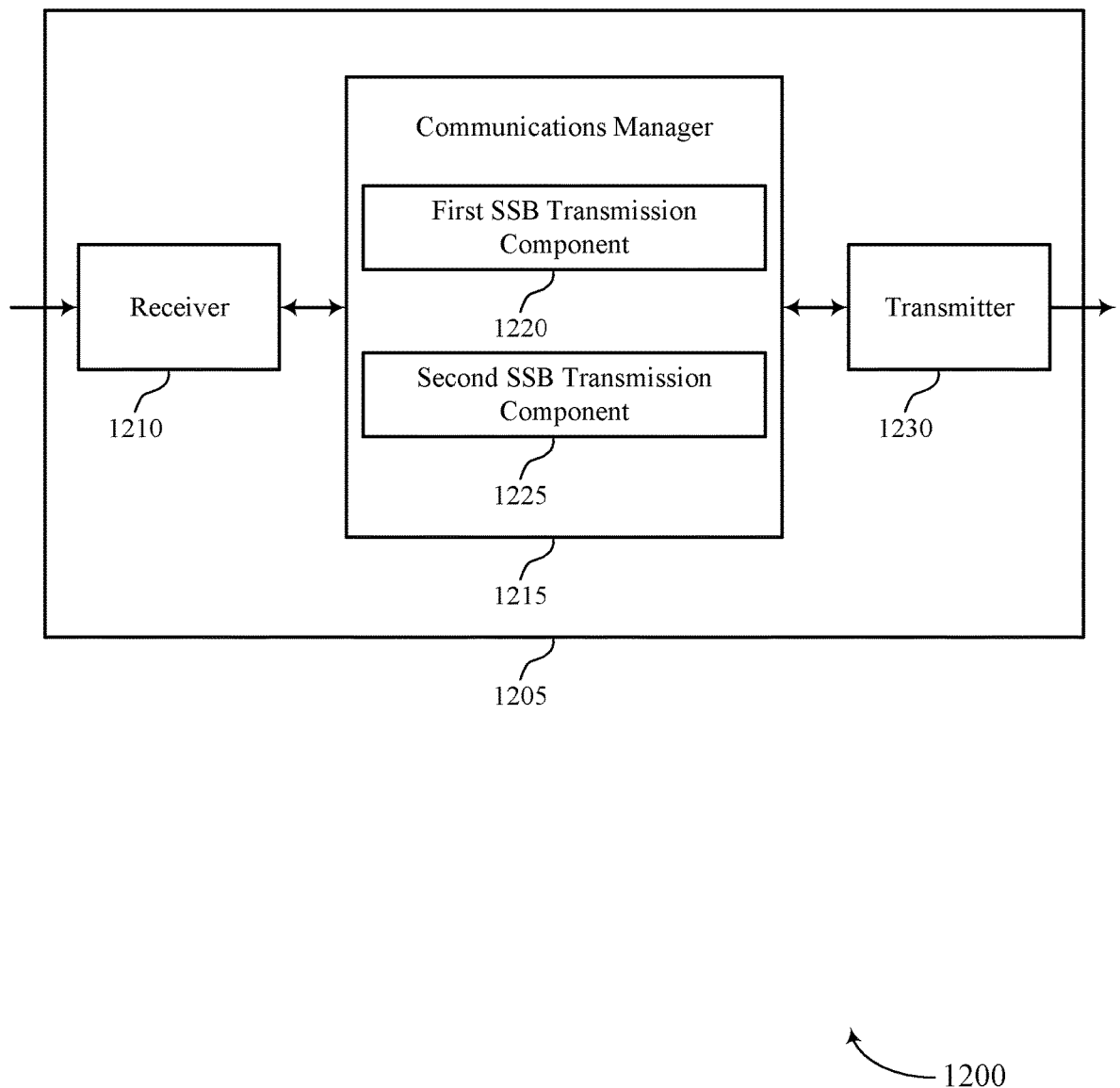

FIG. 12 shows a block diagram 1200 of a device 1205 that supports techniques for using an SSB for measurements in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for using an SSB for measurements). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a first SSB transmission component 1220 and a second SSB transmission component 1225. The communications manager 1215 may be an example of aspects of the communications manager 1410 described herein.

The first SSB transmission component 1220 may transmit, in a first bandwidth region, a first type of SSB including one or more broadcast signals, one or more first synchronization signals, and one or more second synchronization signals.

The second SSB transmission component 1225 may transmit, in a second bandwidth region, a second type of SSB that includes a first subset of signals of the first type of SSB and excludes a second subset of signals of the first type of SSB, where a management procedure for a communication link between a UE and the base station is based on the second type of SSB.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
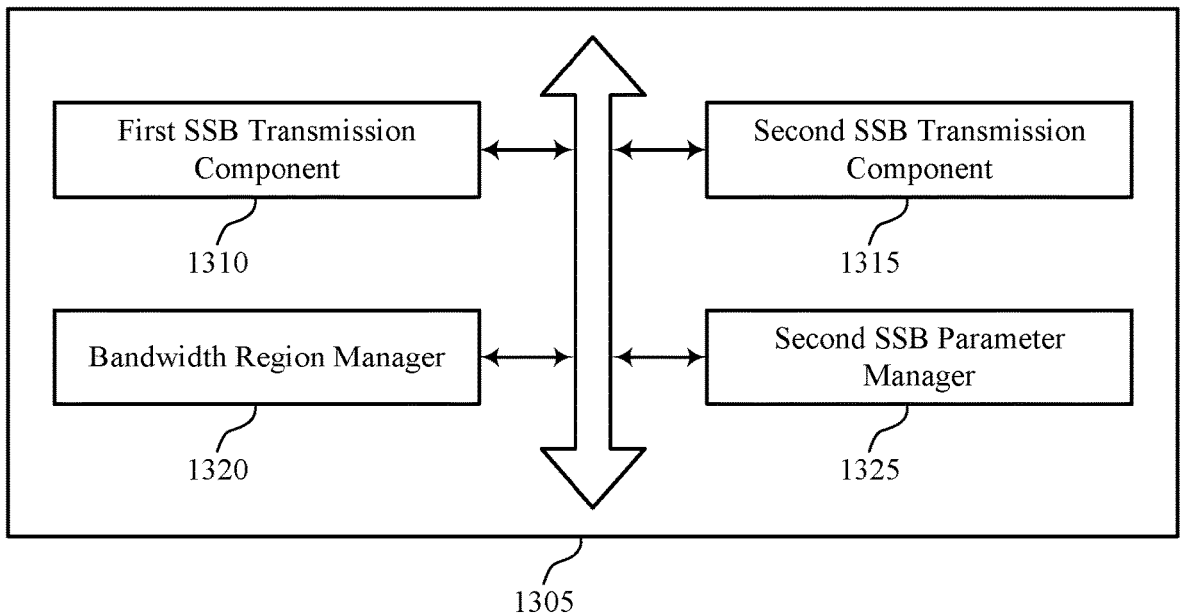
FIG. 13 shows a block diagram of a communications manager that supports techniques for using an SSB for measurements in accordance with aspects of the present disclosure.

FIG. 13 shows a block diagram 1300 of a communications manager 1305 that supports techniques for using an SSB for measurements in accordance with aspects of the present disclosure. The communications manager 1305 may be an example of aspects of a communications manager 1115, a communications manager 1215, or a communications manager 1410 described herein. The communications manager 1305 may include a first SSB transmission component 1310, a second SSB transmission component 1315, a bandwidth region manager 1320, and a second SSB parameter manager 1325. Each of these components may communicate, directly or indirectly, with one another (e.g., via one or more buses).

The first SSB transmission component 1310 may transmit, in a first bandwidth region, a first type of SSB including one or more broadcast signals, one or more first synchronization signals, and one or more second synchronization signals.

The second SSB transmission component 1315 may transmit, in a second bandwidth region, a second type of SSB that includes a first subset of signals of the first type of SSB and excludes a second subset of signals of the first type of SSB, where a management procedure for a communication link between a UE and the base station is based on the second type of SSB. In some cases, the second subset of signals excluded from the second type of SSB includes the one or more broadcast signals, and where the one or more broadcast signals include one or more reference signals and one or more information blocks transmitted via a broadcast channel. In some cases, the first subset of signals of the second type of SSB includes a first synchronization signal of the one or more first synchronization signals or a second synchronization signal of the one or more second synchronization signals. In some cases, the management procedure includes an RLM procedure, an RRM procedure, a beam management procedure, a BFD procedure, a BFR procedure, or any combination thereof.

The bandwidth region manager 1320 may identify that a bandwidth region used for communications with the UE excludes at least a portion of a bandwidth associated with the first type of SSB. In some examples, the bandwidth region manager 1320 may determine that the UE is to perform the management procedure based on the second type of SSB based on identifying that the bandwidth region used for communications with the UE excludes the at least a portion of the bandwidth associated with the first type of SSB.

In some examples, the bandwidth region manager 1320 may transmit, to the UE, an indication that the second type of SSB is transmitted in the second bandwidth region, where the management procedure is based on the indication that the second type of SSB is transmitted in the second bandwidth region. In some examples, the bandwidth region manager 1320 may transmit, to the UE, an indication that the second bandwidth region is associated with one or more management procedures for the communication link between the UE and the base station that include the management procedure, where the management procedure is based on the indication that the second bandwidth region is associated with the one or more management procedures. In some examples, the bandwidth region manager 1320 may transmit, to the UE, an indication that the second type of SSB is transmitted in one or more bandwidth regions that include the second bandwidth region.

In some examples, the bandwidth region manager 1320 may perform the management procedure is independent of whether the second type of SSB is received in the second bandwidth region, is received in a different bandwidth region of the one or more bandwidth regions, or any combination thereof. In some examples, the bandwidth region manager 1320 may transmit, to the UE, an indication that one or more additional bandwidth regions are associated with one or more management procedures for the communication link between the UE and the base station that include the management procedure.

In some examples, the bandwidth region manager 1320 may transmit, to the UE, a pattern for monitoring at least a portion of the second bandwidth region according to a periodicity, where the management procedure is based on monitoring the second bandwidth region according to the periodicity. In some examples, the bandwidth region manager 1320 may transmit, to the UE, one or more parameters associated with a periodicity for monitoring at least a portion of the second bandwidth region and one or more parameters for identifying the second bandwidth region, where the management procedure is based on the one or more parameters associated with the periodicity and the one or more parameters for identifying the second bandwidth region.

In some examples, the bandwidth region manager 1320 may transmit, to the UE, an indication of a pattern of a bandwidth region used to transmit the second type of SSB, the pattern of the bandwidth region corresponding to one or more parameters independent of a frequency monitoring pattern at the UE, where the management procedure is based on the indication of the pattern of the bandwidth region used to transmit the second type of SSB.

In some examples, the bandwidth region manager 1320 may transmit, to the UE, an indication of a change in a configuration for the second bandwidth region, where the management procedure is based on the change in the configuration for the second bandwidth region. In some examples, the bandwidth region manager 1320 may transmit, to the UE, an indication of one or more parameters defining an offset between a frequency location of an active bandwidth region of the UE and a frequency location of the second type of SSB, a frequency location of the second bandwidth region, or any combination thereof, where the management procedure is based on the one or more parameters defining the offset.

In some cases, the one or more parameters for identifying the second bandwidth region include an indication to identify that the second bandwidth region is closer to an active bandwidth region currently used by the UE than one or more other bandwidth regions associated with transmitting the second type of SSB. In some cases, the one or more parameters for identifying the second bandwidth region include an indication to identify a pattern for monitoring one or more bandwidth regions used for transmitting the second type of SSB. In some cases, the one or more parameters for identifying the second bandwidth region include an indication to identify a group of one or more bandwidth regions including an active bandwidth region of the UE and the second bandwidth region. In some cases, the first bandwidth region and the second bandwidth region include BWPs, narrow BWPs, or any combination thereof.

The second SSB parameter manager 1325 may transmit, to the UE, an indication of one or more parameters associated with the second type of SSB and with one or more management procedures for the communication link between the UE and the base station that include the management procedure, where the management procedure is based on receiving the indication of the one or more parameters. In some examples, the second SSB parameter manager 1325 may identify a default configuration for performing the management procedure based on using the second type of SSB, where the management procedure is based on the default configuration for performing the management procedure based on the second type of SSB.

In some examples, the second SSB parameter manager 1325 may identify that one or more random access occasions associated with the management procedure are configured to be QCLed with the second type of SSB. In some examples, the second SSB parameter manager 1325 may identify that one or more search spaces associated with the management procedure are configured to be QCLed with the second type of SSB. In some examples, the second SSB parameter manager 1325 may transmit, to the UE, an indication of a change in a configuration for the second type of SSB in the second bandwidth region, where the management procedure is based on the change in the configuration for the second type of SSB in the second bandwidth region. In some cases, the one or more parameters include one or more indices of the second type of SSB, one or more thresholds associated with the one or more management procedures, or any combination thereof.

Figure 14:
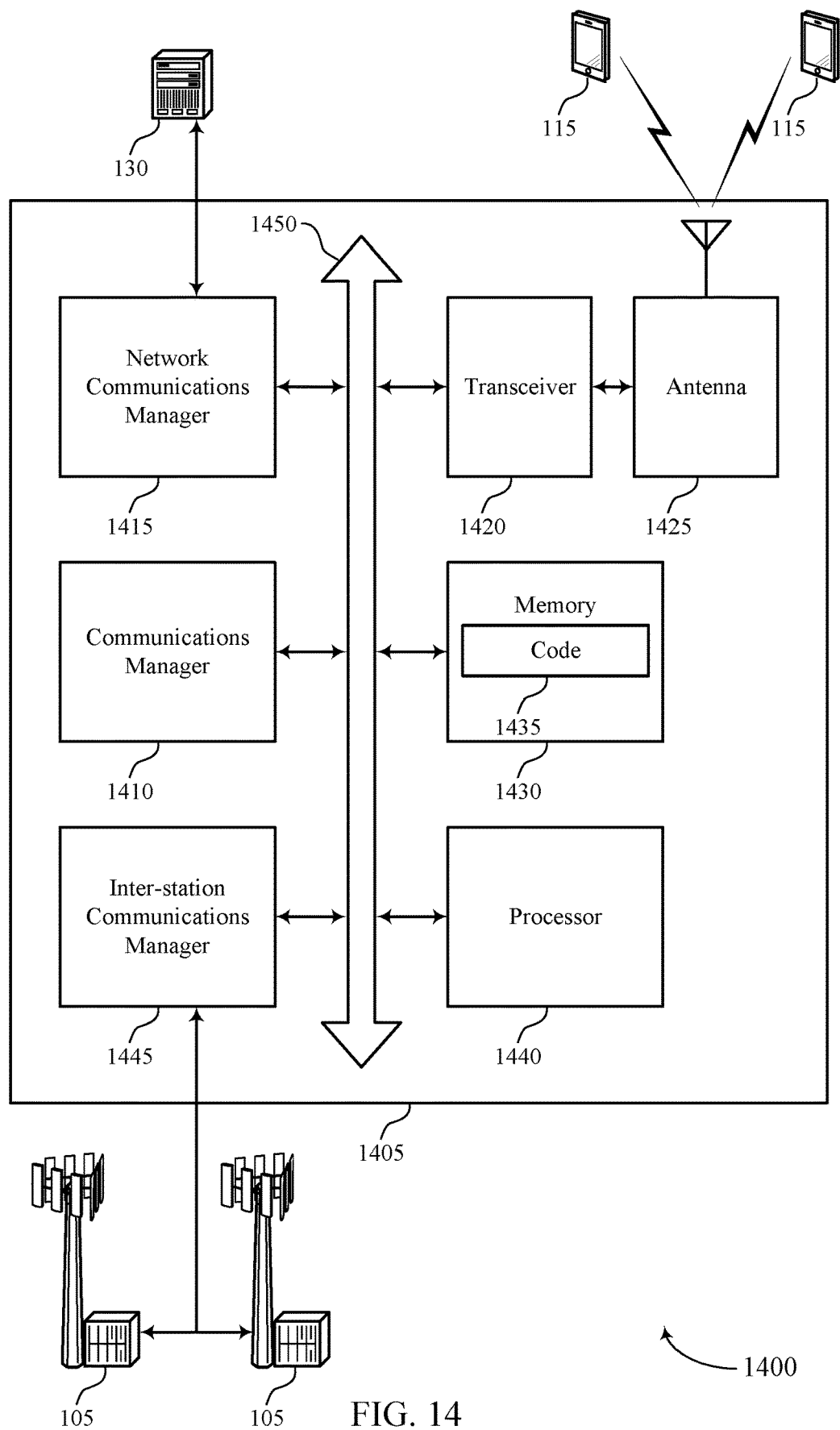
FIG. 14 shows a diagram of a system including a device that supports techniques for using an SSB for measurements in accordance with aspects of the present disclosure.

FIG. 14 shows a diagram of a system 1400 including a device 1405 that supports techniques for using an SSB for measurements in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be coupled via one or more buses (e.g., bus 1450). Components in a wireless communication system may be coupled (for example, operatively, communicatively, functionally, electronically, and/or electrically) to each other.

The communications manager 1410 may transmit, in a first bandwidth region, a first type of SSB including one or more broadcast signals, one or more first synchronization signals, and one or more second synchronization signals and transmit, in a second bandwidth region, a second type of SSB that includes a first subset of signals of the first type of SSB and excludes a second subset of signals of the first type of SSB, where a management procedure for a communication link between a UE and the base station is based on the second type of SSB.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for using an SSB for measurements).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface in an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
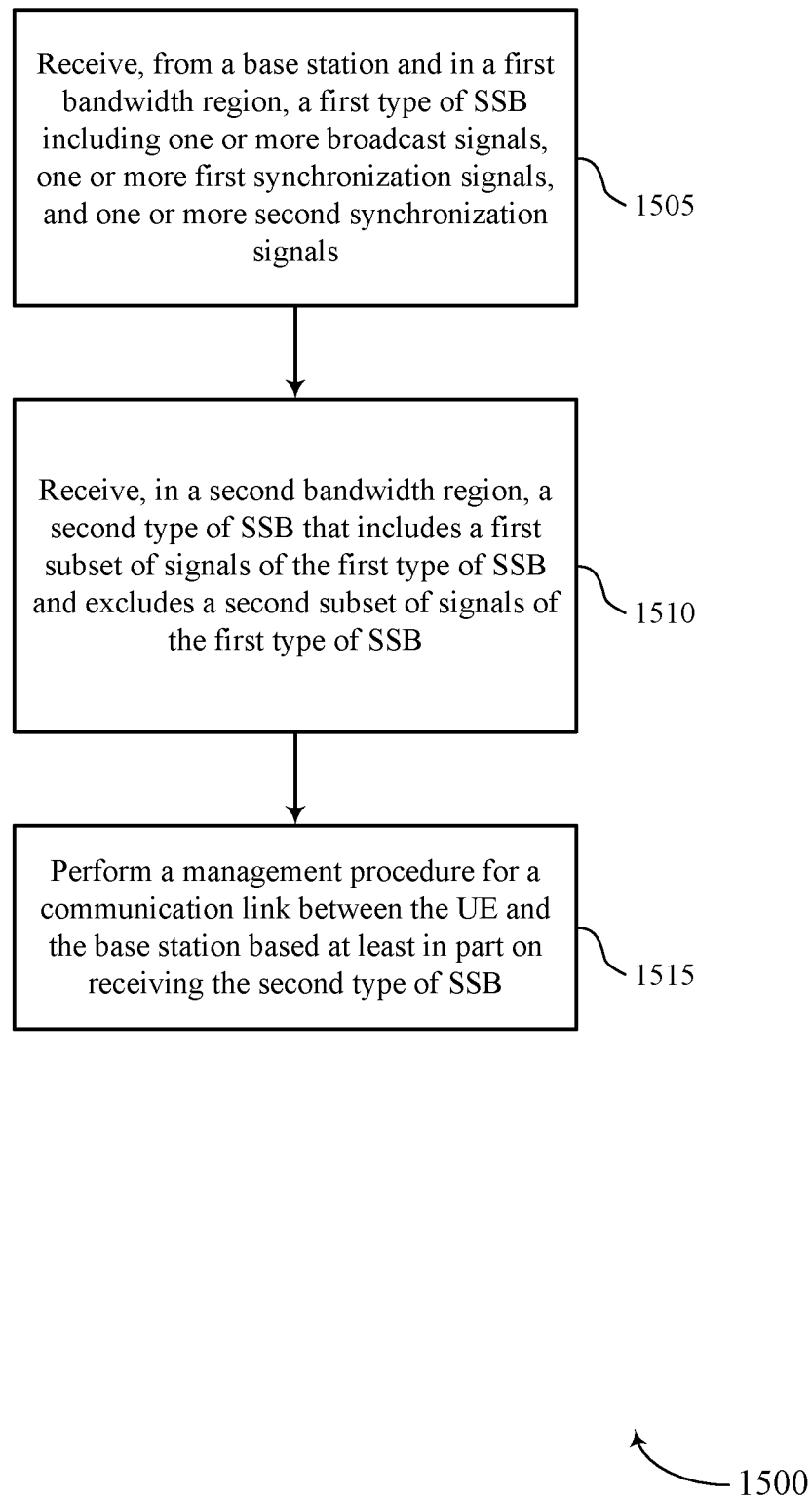
FIGS. 15 through 18 show flowcharts illustrating methods that support techniques for using an SSB for measurements in accordance with aspects of the present disclosure.

FIG. 15 shows a flowchart illustrating a method 1500 that supports techniques for using an SSB for measurements in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station and in a first bandwidth region, a first type of SSB including one or more broadcast signals, one or more first synchronization signals, and one or more second synchronization signals. The operations of 1505 may be performed according to the methods described herein. In some examples, aspects of the operations of 1505 may be performed by a first SSB reception component as described with reference to FIGS. 7 through 10.

At 1510, the UE may receive, in a second bandwidth region, a second type of SSB that includes a first subset of signals of the first type of SSB and excludes a second subset of signals of the first type of SSB. The operations of 1510 may be performed according to the methods described herein. In some examples, aspects of the operations of 1510 may be performed by a second SSB reception component as described with reference to FIGS. 7 through 10.

At 1515, the UE may perform a management procedure for a communication link between the UE and the base station based at least in part on receiving the second type of SSB. The operations of 1515 may be performed according to the methods described herein. In some examples, aspects of the operations of 1515 may be performed by a management procedure component as described with reference to FIGS. 7 through 10.

Figure 16:
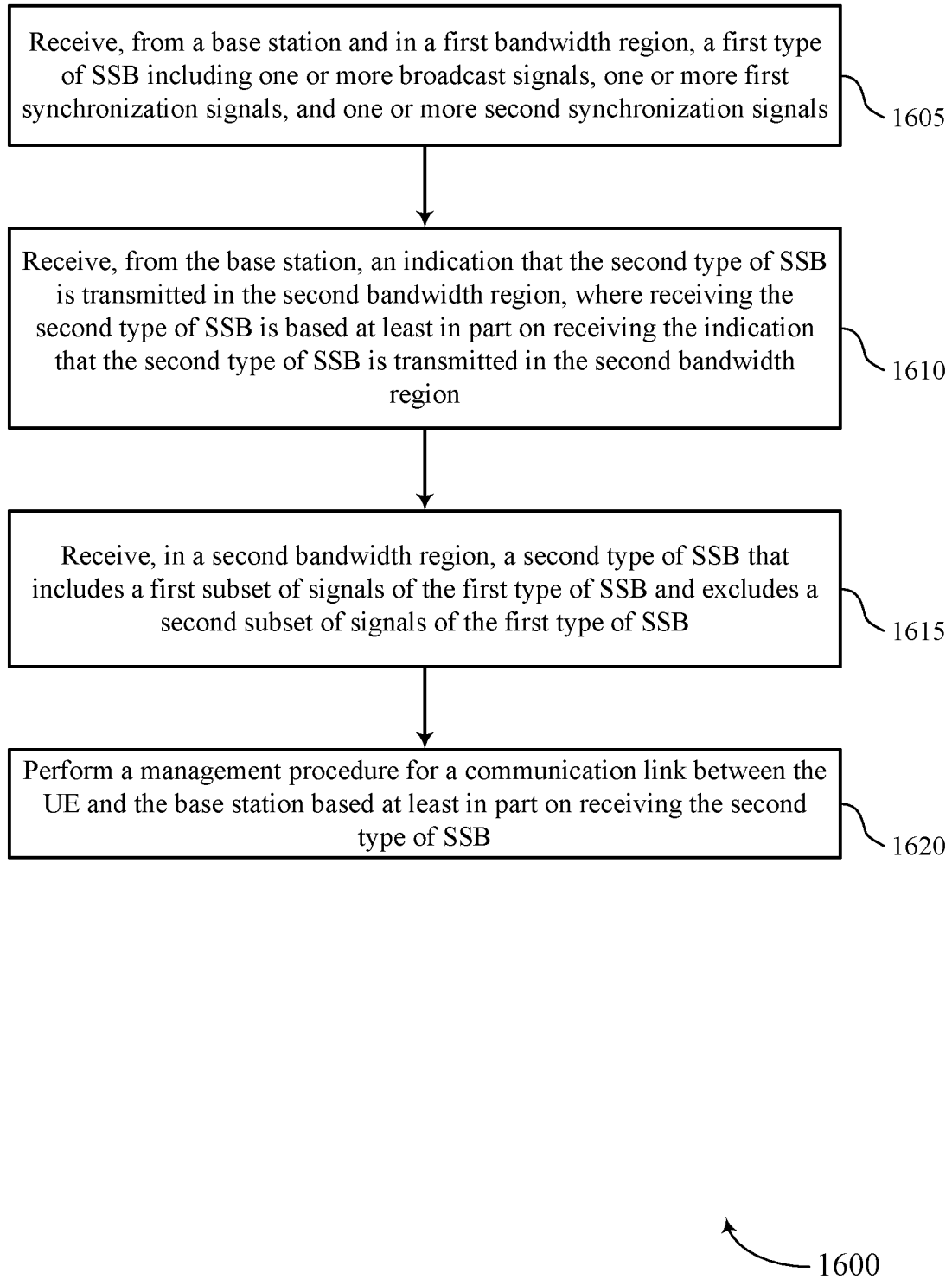

FIG. 16 shows a flowchart illustrating a method 1600 that supports techniques for using an SSB for measurements in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station and in a first bandwidth region, a first type of SSB including one or more broadcast signals, one or more first synchronization signals, and one or more second synchronization signals. The operations of 1605 may be performed according to the methods described herein. In some examples, aspects of the operations of 1605 may be performed by a first SSB reception component as described with reference to FIGS. 7 through 10.

At 1610, the UE may receive, from the base station, an indication that a second type of SSB is transmitted in a second bandwidth region, where receiving the second type of SSB is based at least in part on receiving the indication that the second type of SSB is transmitted in the second bandwidth region. The operations of 1610 may be performed according to the methods described herein. In some examples, aspects of the operations of 1610 may be performed by a bandwidth region component as described with reference to FIGS. 7 through 10.

At 1615, the UE may receive, in the second bandwidth region, the second type of SSB that includes a first subset of signals of the first type of SSB and excludes a second subset of signals of the first type of SSB. The operations of 1615 may be performed according to the methods described herein. In some examples, aspects of the operations of 1615 may be performed by a second SSB reception component as described with reference to FIGS. 7 through 10.

At 1620, the UE may perform a management procedure for a communication link between the UE and the base station based at least in part on receiving the second type of SSB. The operations of 1620 may be performed according to the methods described herein. In some examples, aspects of the operations of 1620 may be performed by a management procedure component as described with reference to FIGS. 7 through 10.

Figure 17:
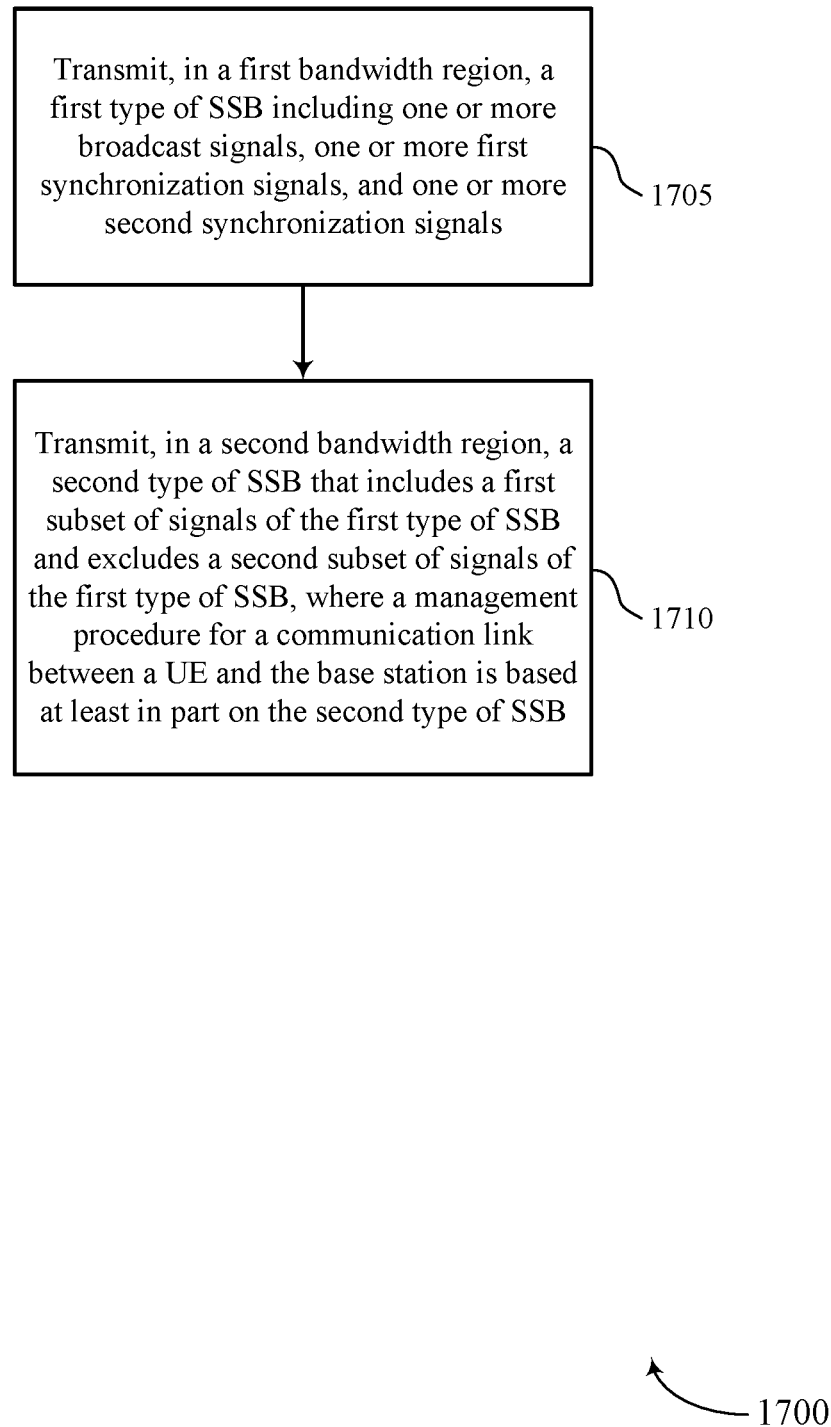

FIG. 17 shows a flowchart illustrating a method 1700 that supports techniques for using an SSB for measurements in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, in a first bandwidth region, a first type of SSB including one or more broadcast signals, one or more first synchronization signals, and one or more second synchronization signals. The operations of 1705 may be performed according to the methods described herein. In some examples, aspects of the operations of 1705 may be performed by a first SSB transmission component as described with reference to FIGS. 11 through 14.

At 1710, the base station may transmit, in a second bandwidth region, a second type of SSB that includes a first subset of signals of the first type of SSB and excludes a second subset of signals of the first type of SSB, where a management procedure for a communication link between a UE and the base station is based at least in part on the second type of SSB. The operations of 1710 may be performed according to the methods described herein. In some examples, aspects of the operations of 1710 may be performed by a second SSB transmission component as described with reference to FIGS. 11 through 14.

Figure 18:
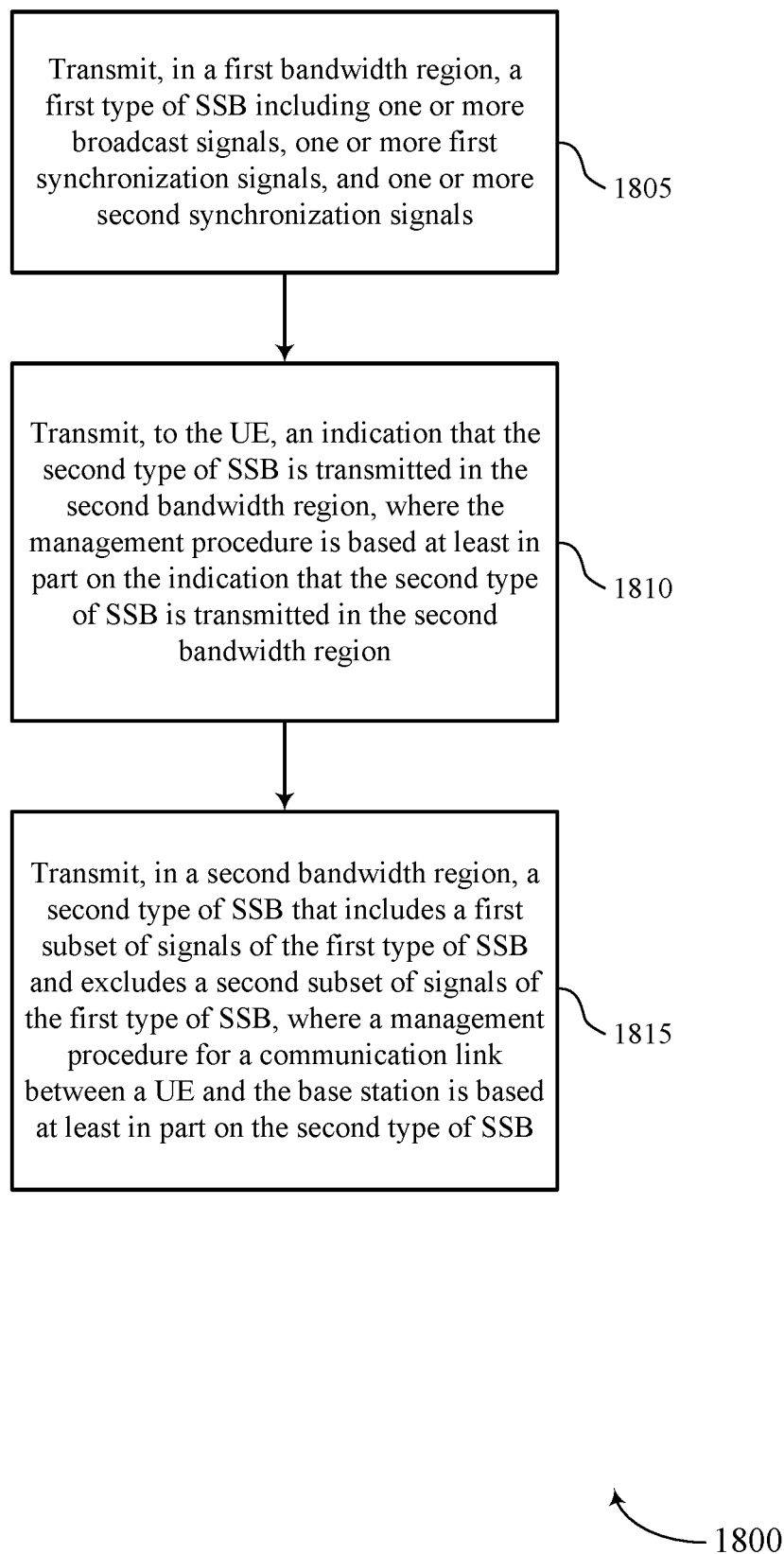

FIG. 18 shows a flowchart illustrating a method 1800 that supports techniques for using an SSB for measurements in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, in a first bandwidth region, a first type of SSB including one or more broadcast signals, one or more first synchronization signals, and one or more second synchronization signals. The operations of 1805 may be performed according to the methods described herein. In some examples, aspects of the operations of 1805 may be performed by a first SSB transmission component as described with reference to FIGS. 11 through 14.

At 1810, the base station may transmit, to the UE, an indication that a second type of SSB is transmitted in a second bandwidth region, where the management procedure is based at least in part on the indication that the second type of SSB is transmitted in the second bandwidth region. The operations of 1810 may be performed according to the methods described herein. In some examples, aspects of the operations of 1810 may be performed by a bandwidth region manager as described with reference to FIGS. 11 through 14.

At 1815, the base station may transmit, in the second bandwidth region, the second type of SSB that includes a first subset of signals of the first type of SSB and excludes a second subset of signals of the first type of SSB, where a management procedure for a communication link between a UE and the base station is based at least in part on the second type of SSB. The operations of 1815 may be performed according to the methods described herein. In some examples, aspects of the operations of 1815 may be performed by a second SSB transmission component as described with reference to FIGS. 11 through 14.

The following provides an overview of aspects of the present disclosure:

Aspect 1: A method for wireless communication at a UE, comprising: receiving, from a base station and in a first bandwidth region, a first type of SSB comprising one or more broadcast signals, one or more first synchronization signals, and one or more second synchronization signals; receiving, in a second bandwidth region, a second type of SSB that comprises a first subset of signals of the first type of SSB and excludes a second subset of signals of the first type of SSB; and performing a management procedure for a communication link between the UE and the base station based at least in part on receiving the second type of SSB.

Aspect 2: The method of aspect 1, wherein the second subset of signals excluded from the second type of SSB comprises the one or more broadcast signals, and the one or more broadcast signals comprise one or more reference signals and one or more information blocks transmitted via a broadcast channel.

Aspect 3: The method of any of aspects 1 through 2, wherein the first subset of signals of the second type of SSB comprises a first synchronization signal of the one or more first synchronization signals or a second synchronization signal of the one or more second synchronization signals.

Aspect 4: The method of any of aspects 1 through 3, further comprising: determining that a bandwidth region used for communications with the base station excludes at least a portion of a bandwidth associated with the first type of SSB, wherein receiving the second type of SSB is based at least in part on determining that the bandwidth region used for communications with the base station excludes the at least the portion of the bandwidth associated with the first type of SSB.

Aspect 5: The method of any of aspects 1 through 4, further comprising: receiving, from the base station, an indication that the second type of SSB is transmitted in the second bandwidth region, wherein receiving the second type of SSB is based at least in part on receiving the indication that the second type of SSB is transmitted in the second bandwidth region.

Aspect 6: The method of any of aspects 1 through 5, further comprising: receiving, from the base station, an indication that the second bandwidth region is associated with one or more management procedures for the communication link between the UE and the base station that comprise the management procedure, wherein performing the management procedure is based at least in part on receiving the indication that the second bandwidth region is associated with the one or more management procedures.

Aspect 7: The method of any of aspects 1 through 6, further comprising: receiving, from the base station, an indication that the second type of SSB is transmitted in one or more bandwidth regions that include the second bandwidth region.

Aspect 8: The method of aspect 7, wherein performing the management procedure is independent of whether the second type of SSB is received in the second bandwidth region, is received in a different bandwidth region of one or more additional bandwidth regions, or any combination thereof.

Aspect 9: The method of any of aspects 1 through 8, further comprising: receiving, from the base station, an indication that one or more additional bandwidth regions are associated with one or more management procedures for the communication link between the UE and the base station that comprise the management procedure.

Aspect 10: The method of any of aspects 1 through 9, further comprising: receiving, from the base station, an indication of one or more parameters associated with the second type of SSB and with one or more management procedures for the communication link between the UE and the base station that comprise the management procedure, wherein performing the management procedure is based at least in part on receiving the indication of the one or more parameters.

Aspect 11: The method of aspect 10, wherein the one or more parameters comprise one or more indices of the second type of SSB, one or more thresholds associated with the one or more management procedures, or any combination thereof.

Aspect 12: The method of any of aspects 1 through 11, further comprising: identifying a default configuration for performing the management procedure based at least in part on using the second type of SSB, wherein performing the management procedure is based at least in part on identifying the default configuration for performing the management procedure based at least in part on the second type of SSB.

Aspect 13: The method of any of aspects 1 through 12, further comprising: identifying that one or more random access occasions associated with the management procedure are configured to be QCLed with the second type of SSB; and identifying that one or more search spaces associated with the management procedure are configured to be QCLed with the second type of SSB.

Aspect 14: The method of any of aspects 1 through 13, further comprising: monitoring at least a portion of the second bandwidth region according to a periodicity, wherein receiving the second type of SSB is based at least in part on monitoring the second bandwidth region according to the periodicity.

Aspect 15: The method of aspect 14, further comprising: receiving, from the base station, a pattern for monitoring one or more bandwidth regions, wherein monitoring the second bandwidth region according to the periodicity is based at least in part on the pattern for monitoring the one or more bandwidth regions.

Aspect 16: The method of aspect 14, wherein monitoring the at least the portion of the second bandwidth region according to the periodicity comprises: receiving, from the base station, one or more parameters associated with the periodicity and one or more parameters for identifying the second bandwidth region; identifying a value of a timer associated with the periodicity based at least in part on receiving the one or more parameters associated with the periodicity; and monitoring the at least the portion of the second bandwidth region based at least in part on the value of the timer and the one or more parameters for identifying the second bandwidth region.

Aspect 17: The method of aspect 16, further comprising: identifying, based at least in part on the one or more parameters for identifying the second bandwidth region, that the second bandwidth region is closer to an active bandwidth region currently used by the UE than one or more other bandwidth regions associated with transmitting the second type of SSB, wherein monitoring the at least the portion of the second bandwidth region is based at least in part on identifying that the second bandwidth region is closer to the active bandwidth region currently used by the UE than the one or more other bandwidth regions.

Aspect 18: The method of any of aspects 16 through 17, further comprising: identifying, based at least in part on the one or more parameters for identifying the second bandwidth region, a pattern for monitoring one or more bandwidth regions used for transmitting the second type of SSB, wherein monitoring the at least the portion of the second bandwidth region is based at least in part on identifying the pattern for monitoring one or more other bandwidth regions.

Aspect 19: The method of any of aspects 16 through 18, further comprising: identifying, based at least in part on the one or more parameters for identifying the second bandwidth region, a group of one or more bandwidth regions comprising an active bandwidth region of the UE and the second bandwidth region, wherein monitoring the at least the portion of the second bandwidth region is based at least in part on identifying the group of one or more bandwidth regions.

Aspect 20: The method of any of aspects 1 through 19, further comprising: receiving, from the base station, an indication of a pattern of a bandwidth region used to transmit the second type of SSB, the pattern of the bandwidth region corresponding to one or more parameters independent of a frequency monitoring pattern at the UE, wherein receiving the second type of SSB is based at least in part on the indication of the pattern of the bandwidth region used to transmit the second type of SSB.

Aspect 21: The method of any of aspects 1 through 20, further comprising: receiving, from the base station, an indication of a change in a configuration for one or more bandwidth regions used to transmit the second type of SSB, wherein receiving the second type of SSB is based at least in part on the change in the configuration for the one or more bandwidth regions used to transmit the second type of SSB.

Aspect 22: The method of any of aspects 1 through 21, further comprising: receiving, from the base station, an indication of a change in a configuration for the second type of SSB in the second bandwidth region, wherein receiving the second type of SSB is based at least in part on the change in the configuration for the second type of SSB in the second bandwidth region.

Aspect 23: The method of any of aspects 1 through 22, further comprising: receiving, from the base station, an indication of one or more parameters defining an offset between a frequency location of an active bandwidth region of the UE and a frequency location of the second type of SSB, a frequency location of the second bandwidth region, or any combination thereof, wherein receiving the second type of SSB is based at least in part on the one or more parameters defining the offset.

Aspect 24: The method of any of aspects 1 through 23, wherein the management procedure comprises an RLM procedure, an RRM procedure, a beam management procedure, a BFD procedure, a BFR procedure, or any combination thereof.

Aspect 25: The method of any of aspects 1 through 24, wherein the first bandwidth region and the second bandwidth region comprise BWPs, narrow BWPs, or any combination thereof.

Aspect 26: A method for wireless communication at a base station, comprising: transmitting, in a first bandwidth region, a first type of SSB comprising one or more broadcast signals, one or more first synchronization signals, and one or more second synchronization signals; and transmitting, in a second bandwidth region, a second type of SSB that comprises a first subset of signals of the first type of SSB and excludes a second subset of signals of the first type of SSB, wherein a management procedure for a communication link between a UE and the base station is based at least in part on the second type of SSB.

Aspect 27: The method of aspect 26, wherein the second subset of signals excluded from the second type of SSB comprises the one or more broadcast signals, and the one or more broadcast signals comprise one or more reference signals and one or more information blocks transmitted via a broadcast channel.

Aspect 28: The method of any of aspects 26 through 27, wherein the first subset of signals of the second type of SSB comprises a first synchronization signal of the one or more first synchronization signals or a second synchronization signal of the one or more second synchronization signals.

Aspect 29: The method of any of aspects 26 through 28, further comprising: identifying that a bandwidth region used for communications with the UE excludes at least a portion of a bandwidth associated with the first type of SSB; and determining that the UE is to perform the management procedure based at least in part on the second type of SSB based at least in part on identifying that the bandwidth region used for communications with the UE excludes the at least a portion of the bandwidth associated with the first type of SSB.

Aspect 30: The method of any of aspects 26 through 29, further comprising: transmitting, to the UE, an indication that the second type of SSB is transmitted in the second bandwidth region, wherein the management procedure is based at least in part on the indication that the second type of SSB is transmitted in the second bandwidth region.

Aspect 31: The method of any of aspects 26 through 30, further comprising: transmitting, to the UE, an indication that the second bandwidth region is associated with one or more management procedures for the communication link between the UE and the base station that comprise the management procedure, wherein the management procedure is based at least in part on the indication that the second bandwidth region is associated with the one or more management procedures.

Aspect 32: The method of any of aspects 26 through 31, further comprising: transmitting, to the UE, an indication that the second type of SSB is transmitted in one or more bandwidth regions that include the second bandwidth region.

Aspect 33: The method of aspect 32, wherein performing the management procedure is independent of whether the second type of SSB is received in the second bandwidth region, is received in a different bandwidth region of the one or more bandwidth regions, or any combination thereof.

Aspect 34: The method of any of aspects 26 through 33, further comprising: transmitting, to the UE, an indication that one or more additional bandwidth regions are associated with one or more management procedures for the communication link between the UE and the base station that comprise the management procedure.

Aspect 35: The method of any of aspects 26 through 34, further comprising: transmitting, to the UE, an indication of one or more parameters associated with the second type of SSB and with one or more management procedures for the communication link between the UE and the base station that comprise the management procedure, wherein the management procedure is based at least in part on receiving the indication of the one or more parameters.

Aspect 36: The method of aspect 35, wherein the one or more parameters comprise one or more indices of the second type of SSB, one or more thresholds associated with the one or more management procedures, or any combination thereof.

Aspect 37: The method of any of aspects 26 through 36, further comprising: identifying a default configuration for performing the management procedure based at least in part on using the second type of SSB, wherein the management procedure is based at least in part on the default configuration for performing the management procedure based at least in part on the second type of SSB.

Aspect 38: The method of any of aspects 26 through 37, further comprising: identifying that one or more random access occasions associated with the management procedure are configured to be QCLed with the second type of SSB; and identifying that one or more search spaces associated with the management procedure are configured to be QCLed with the second type of SSB.

Aspect 39: The method of any of aspects 26 through 38, further comprising: transmitting, to the UE, a pattern for monitoring at least a portion of the second bandwidth region according to a periodicity, wherein the management procedure is based at least in part on monitoring the second bandwidth region according to the periodicity.

Aspect 40: The method of any of aspects 26 through 38, further comprising: transmitting, to the UE, one or more parameters associated with a periodicity for monitoring at least a portion of the second bandwidth region and one or more parameters for identifying the second bandwidth region, wherein the management procedure is based at least in part on the one or more parameters associated with the periodicity and the one or more parameters for identifying the second bandwidth region.

Aspect 41: The method of aspect 40, wherein the one or more parameters for identifying the second bandwidth region include an indication to identify that the second bandwidth region is closer to an active bandwidth region currently used by the UE than one or more other bandwidth regions associated with transmitting the second type of SSB.

Aspect 42: The method of any of aspects 40 through 41, wherein the one or more parameters for identifying the second bandwidth region include an indication to identify a pattern for monitoring one or more bandwidth regions used for transmitting the second type of SSB.

Aspect 43: The method of any of aspects 40 through 42, wherein the one or more parameters for identifying the second bandwidth region include an indication to identify a group of one or more bandwidth regions comprising an active bandwidth region of the UE and the second bandwidth region.

Aspect 44: The method of any of aspects 26 through 43, further comprising: transmitting, to the UE, an indication of a pattern of a bandwidth region used to transmit the second type of SSB, the pattern of the bandwidth region corresponding to one or more parameters independent of a frequency monitoring pattern at the UE, wherein the management procedure is based at least in part on the indication of the pattern of the bandwidth region used to transmit the second type of SSB.

Aspect 45: The method of any of aspects 26 through 44, further comprising: transmitting, to the UE, an indication of a change in a configuration for the second bandwidth region, wherein the management procedure is based at least in part on the change in the configuration for the second bandwidth region.

Aspect 46: The method of any of aspects 26 through 45, further comprising: transmitting, to the UE, an indication of a change in a configuration for the second type of SSB in the second bandwidth region, wherein the management procedure is based at least in part on the change in the configuration for the second type of SSB in the second bandwidth region.

Aspect 47: The method of any of aspects 26 through 46, further comprising: transmitting, to the UE, an indication of one or more parameters defining an offset between a frequency location of an active bandwidth region of the UE and a frequency location of the second type of SSB, a frequency location of the second bandwidth region, or any combination thereof, wherein the management procedure is based at least in part on the one or more parameters defining the offset.

Aspect 48: The method of any of aspects 26 through 47, wherein the management procedure comprises an RLM procedure, an RRM procedure, a beam management procedure, a BFD procedure, a BFR procedure, or any combination thereof.

Aspect 49: The method of any of aspects 26 through 48, wherein the first bandwidth region and the second bandwidth region comprise BWPs, narrow BWPs, or any combination thereof.

Aspect 50: An apparatus for wireless communication at a UE, comprising at least one processor; memory coupled with the at least one processor; and instructions stored in the memory and executable by the at least one processor to cause the apparatus to perform a method of any of aspects 1 through 25.

Aspect 51: An apparatus for wireless communication at a UE, comprising at least one means for performing a method of any of aspects 1 through 25.

Aspect 52: A non-transitory computer-readable medium storing code for wireless communication at a UE, the code comprising instructions executable by a processor to perform a method of any of aspects 1 through 25.

Aspect 53: An apparatus for wireless communication at a base station, comprising at least one processor; memory coupled with the at least one processor; and instructions stored in the memory and executable by the at least one processor to cause the apparatus to perform a method of any of aspects 26 through 49.

Aspect 54: An apparatus for wireless communication at a base station, comprising at least one means for performing a method of any of aspects 26 through 49.

Aspect 55: A non-transitory computer-readable medium storing code for wireless communication at a base station, the code comprising instructions executable by a processor to perform a method of any of aspects 26 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are in the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included in the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are in the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from an access network entity and in a first bandwidth region associated with a first bandwidth, a first type of synchronization signal block comprising one or more broadcast signals, one or more first synchronization signals, and one or more second synchronization signals;
receiving, in a second bandwidth region associated with a second bandwidth at least partially different from the first bandwidth, a second type of synchronization signal block that comprises a first subset of signals of the first type of synchronization signal block and excludes a second subset of signals of the first type of synchronization signal block; and
performing a management procedure for a communication link between the UE and the access network entity based at least in part on receiving the second type of synchronization signal block.

2. The method of claim 1, wherein:
the second subset of signals excluded from the second type of synchronization signal block comprises the one or more broadcast signals, and wherein the one or more broadcast signals comprise one or more reference signals and one or more information blocks transmitted via a broadcast channel; and the first subset of signals of the second type of synchronization signal block comprises a first synchronization signal of the one or more first synchronization signals or a second synchronization signal of the one or more second synchronization signals.

3. The method of claim 1, further comprising:
determining that a bandwidth region used for communications with the access network entity excludes at least a portion of a bandwidth associated with the first type of synchronization signal block, wherein receiving the second type of synchronization signal block is based at least in part on determining that the bandwidth region used for communications with the access network entity excludes the at least the portion of the bandwidth associated with the first type of synchronization signal block.

4. The method of claim 1, further comprising:
receiving, from the access network entity, an indication that the second type of synchronization signal block is transmitted in the second bandwidth region, wherein receiving the second type of synchronization signal block is based at least in part on receiving the indication that the second type of synchronization signal block is transmitted in the second bandwidth region.

5. The method of claim 1, further comprising:
receiving, from the access network entity, an indication that the second bandwidth region is associated with one or more management procedures for the communication link between the UE and the access network entity that comprise the management procedure, wherein performing the management procedure is based at least in part on receiving the indication that the second bandwidth region is associated with the one or more management procedures.

6. The method of claim 1, further comprising:
receiving, from the access network entity, an indication that the second type of synchronization signal block is transmitted in one or more bandwidth regions that include the second bandwidth region.

7. The method of claim 1, further comprising:
receiving, from the access network entity, an indication that one or more additional bandwidth regions are associated with one or more management procedures for the communication link between the UE and the access network entity that comprise the management procedure.

8. The method of claim 1, further comprising:
receiving, from the access network entity, an indication of one or more parameters associated with the second type of synchronization signal block and with one or more management procedures for the communication link between the UE and the access network entity that comprise the management procedure, wherein performing the management procedure is based at least in part on receiving the indication of the one or more parameters.

9. The method of claim 1, further comprising:
identifying a default configuration for performing the management procedure based at least in part on using the second type of synchronization signal block, wherein performing the management procedure is based at least in part on identifying the default configuration for performing the management procedure based at least in part on the second type of synchronization signal block.

10. The method of claim 1, further comprising:
identifying that one or more random access occasions associated with the management procedure are configured to be quasi co-located with the second type of synchronization signal block; and
identifying that one or more search spaces associated with the management procedure are configured to be quasi co-located with the second type of synchronization signal block.

11. The method of claim 1, further comprising:
monitoring at least a portion of the second bandwidth region according to a periodicity, wherein receiving the second type of synchronization signal block is based at least in part on monitoring the second bandwidth region according to the periodicity.

12. The method of claim 1, further comprising:
receiving, from the access network entity, an indication of a pattern of a bandwidth region used to transmit the second type of synchronization signal block, the pattern of the bandwidth region corresponding to one or more parameters independent of a frequency monitoring pattern at the UE, wherein receiving the second type of synchronization signal block is based at least in part on the indication of the pattern of the bandwidth region used to transmit the second type of synchronization signal block.

13. The method of claim 1, further comprising:
receiving, from the access network entity, an indication of a change in a configuration for one or more bandwidth regions used to transmit the second type of synchronization signal block, wherein receiving the second type of synchronization signal block is based at least in part on the change in the configuration for the one or more bandwidth regions used to transmit the second type of synchronization signal block.

14. The method of claim 1, further comprising:
receiving, from the access network entity, an indication of one or more parameters defining an offset between a frequency location of an active bandwidth region of the UE and a frequency location of the second type of synchronization signal block, a frequency location of the second bandwidth region, or any combination thereof, wherein receiving the second type of synchronization signal block is based at least in part on the one or more parameters defining the offset.

15. A method for wireless communication at an access network entity, comprising:
transmitting, in a first bandwidth region associated with a first bandwidth, a first type of synchronization signal block comprising one or more broadcast signals, one or more first synchronization signals, and one or more second synchronization signals; and
transmitting, in a second bandwidth region associated with a second bandwidth at least partially different from the first bandwidth, a second type of synchronization signal block that comprises a first subset of signals of the first type of synchronization signal block and excludes a second subset of signals of the first type of synchronization signal block, wherein a management procedure for a communication link between a UE and the access network entity is based at least in part on the second type of synchronization signal block.

16. The method of claim 15, wherein:
the second subset of signals excluded from the second type of synchronization signal block comprises the one or more broadcast signals, and wherein the one or more broadcast signals comprise one or more reference signals and one or more information blocks transmitted via a broadcast channel; and the first subset of signals of the second type of synchronization signal block comprises a first synchronization signal of the one or more first synchronization signals or a second synchronization signal of the one or more second synchronization signals.

17. The method of claim 15, further comprising:
identifying that a bandwidth region used for communications with the UE excludes at least a portion of a bandwidth associated with the first type of synchronization signal block; and
determining that the UE is to perform the management procedure based at least in part on the second type of synchronization signal block based at least in part on identifying that the bandwidth region used for communications with the UE excludes the at least the portion of the bandwidth associated with the first type of synchronization signal block.

18. The method of claim 15, further comprising:
transmitting, to the UE, an indication that the second type of synchronization signal block is transmitted in the second bandwidth region, wherein the management procedure is based at least in part on the indication that the second type of synchronization signal block is transmitted in the second bandwidth region.

19. The method of claim 15, further comprising:
transmitting, to the UE, an indication that the second bandwidth region is associated with one or more management procedures for the communication link between the UE and the access network entity that comprise the management procedure, wherein the management procedure is based at least in part on the indication that the second bandwidth region is associated with the one or more management procedures.

20. The method of claim 15, further comprising:
transmitting, to the UE, an indication that the second type of synchronization signal block is transmitted in one or more bandwidth regions that include the second bandwidth region.

21. The method of claim 15, further comprising:
transmitting, to the UE, an indication that one or more additional bandwidth regions are associated with one or more management procedures for the communication link between the UE and the access network entity that comprise the management procedure.

22. The method of claim 15, further comprising:
transmitting, to the UE, a pattern for monitoring at least a portion of the second bandwidth region according to a periodicity, wherein the management procedure is based at least in part on monitoring the second bandwidth region according to the periodicity.

23. The method of claim 15, further comprising:
transmitting, to the UE, an indication of a pattern of a bandwidth region used to transmit the second type of synchronization signal block, the pattern of the bandwidth region corresponding to one or more parameters independent of a frequency monitoring pattern at the UE, wherein the management procedure is based at least in part on the indication of the pattern of the bandwidth region used to transmit the second type of synchronization signal block.

24. The method of claim 15, further comprising:
transmitting, to the UE, an indication of one or more parameters defining an offset between a frequency location of an active bandwidth region of the UE and a frequency location of the second type of synchronization signal block, a frequency location of the second bandwidth region, or any combination thereof, wherein the management procedure is based at least in part on the one or more parameters defining the offset.

25. An apparatus for wireless communication at a user equipment (UE), comprising:
at least one processor; and
memory coupled with the at least one processor, the memory storing instructions executable by the at least one processor to cause the UE to:
receive, from an access network entity and in a first bandwidth region associated with a first bandwidth, a first type of synchronization signal block comprising one or more broadcast signals, one or more first synchronization signals, and one or more second synchronization signals;
receive, in a second bandwidth region associated with a second bandwidth at least partially different from the first bandwidth, a second type of synchronization signal block that comprises a first subset of signals of the first type of synchronization signal block and excludes a second subset of signals of the first type of synchronization signal block; and
perform a management procedure for a communication link between the UE and the access network entity based at least in part on receiving the second type of synchronization signal block.

26. The apparatus of claim 25, wherein the instructions are further executable by the at least one processor to cause the UE to:
determine that a bandwidth region used for communications with the access network entity excludes at least a portion of a bandwidth associated with the first type of synchronization signal block, wherein receiving the second type of synchronization signal block is based at least in part on determining that the bandwidth region used for communications with the access network entity excludes the at least the portion of the bandwidth associated with the first type of synchronization signal block.

27. The apparatus of claim 25, wherein the instructions are further executable by the at least one processor to cause the UE to:
receive, from the access network entity, an indication that the second type of synchronization signal block is transmitted in the second bandwidth region, wherein receiving the second type of synchronization signal block is based at least in part on receiving the indication that the second type of synchronization signal block is transmitted in the second bandwidth region.

28. An apparatus for wireless communication at an access network entity, comprising:
at least one processor; and
memory coupled with the at least one processor, the memory storing instructions executable by the at least one processor to cause the access network entity to:
transmit, in a first bandwidth region associated with a first bandwidth, a first type of synchronization signal block comprising one or more broadcast signals, one or more first synchronization signals, and one or more second synchronization signals; and
transmit, in a second bandwidth region associated with a second bandwidth at least partially different from the first bandwidth, a second type of synchronization signal block that comprises a first subset of signals of the first type of synchronization signal block and excludes a second subset of signals of the first type of synchronization signal block, wherein a management procedure for a communication link between a UE and the access network entity is based at least in part on the second type of synchronization signal block.

29. The apparatus of claim 28, wherein the instructions are further executable by the at least one processor to cause the access network entity to:

identify that a bandwidth region used for communications with the UE excludes at least a portion of a bandwidth associated with the first type of synchronization signal block; and determining that the UE is to perform the management procedure based at least in part on the second type of synchronization signal block based at least in part on identifying that the bandwidth region used for communications with the UE excludes the at least Rail the portion of the bandwidth associated with the first type of synchronization signal block.

30. The apparatus of claim 28, wherein the instructions are further executable by the at least one processor to cause the access network entity to:

transmit, to the UE, an indication that the second type of synchronization signal block is transmitted in the second bandwidth region, wherein the management procedure is based at least in part on the indication that the second type of synchronization signal block is transmitted in the second bandwidth region.

31. The method of claim 1, the second bandwidth region excluding at least a portion of the first bandwidth associated with the first type of synchronization signal block.

\* \* \* \* \*